United States Patent
Misra et al.

(10) Patent No.: US 11,889,123 B2
(45) Date of Patent: Jan. 30, 2024

(54) SYSTEMS AND METHODS FOR PARTITIONING VIDEO BLOCKS AT A BOUNDARY OF A PICTURE

(71) Applicant: Sharp Kabushiki Kaisha, Sakai (JP)

(72) Inventors: Kiran Mukesh Misra, Vancouver, WA (US); Weijia Zhu, Vancouver, WA (US); Christopher Andrew Segall, Vancouver, WA (US); Frank Bossen, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/873,231

(22) Filed: Jul. 26, 2022

(65) Prior Publication Data

US 2022/0368952 A1  Nov. 17, 2022

Related U.S. Application Data

(63) Continuation of application No. 17/042,248, filed as application No. PCT/JP2019/013043 on Mar. 26, 2019, now Pat. No. 11,470,359.

(60) Provisional application No. 62/693,325, filed on Jul. 2, 2018, provisional application No. 62/678,902, filed on May 31, 2018, provisional application No. 62/651,059, filed on Mar. 30, 2018.

(51) Int. Cl.
*H04N 11/02* (2006.01)
*H04N 19/96* (2014.01)
*H04N 19/119* (2014.01)
*H04N 19/176* (2014.01)

(52) U.S. Cl.
CPC ........... *H04N 19/96* (2014.11); *H04N 19/119* (2014.11); *H04N 19/176* (2014.11)

(58) Field of Classification Search
CPC ...................................... H04N 19/96
USPC ....................... 375/240.01–240.29
See application file for complete search history.

(56) References Cited

U.S. PATENT DOCUMENTS

| | | | |
|---|---|---|---|
| 2011/0103701 A1* | 5/2011 | Cheon | H04N 19/17 382/233 |
| 2012/0114034 A1* | 5/2012 | Huang | H04N 19/463 375/240.03 |
| 2013/0101031 A1* | 4/2013 | Van der Auwera | H04N 19/198 375/E7.193 |
| 2016/0337661 A1* | 11/2016 | Pang | H04N 19/57 |
| 2017/0006309 A1* | 1/2017 | Liu | H04N 19/597 |
| 2017/0150186 A1* | 5/2017 | Zhang | H04N 19/625 |
| 2017/0272782 A1* | 9/2017 | Li | H04N 19/96 |
| 2017/0280162 A1* | 9/2017 | Zhao | H04N 19/103 |
| 2018/0070110 A1* | 3/2018 | Chuang | H04N 19/119 |
| 2018/0109812 A1* | 4/2018 | Tsai | H04N 19/157 |

(Continued)

OTHER PUBLICATIONS

Misra et al., "Systems and Methods for Partitioning Video Blocks at a Boundary of a Picture for Video Coding", U.S. Appl. No. 17/042,248, filed Sep. 28, 2020.

*Primary Examiner* — Leron Beck
(74) *Attorney, Agent, or Firm* — Keating & Bennett, LLP

(57) ABSTRACT

Method, device, apparatus, and computer-readable storage medium to determine whether video block is a fractional boundary video block (See paragraph [0032] and FIG. 7.) and to partition the fractional boundary video block into inferred partitions using a subset of available partition modes (See paragraph [0033] and FIG. 8.) are disclosed.

4 Claims, 33 Drawing Sheets

(56) References Cited

U.S. PATENT DOCUMENTS

| | | | |
|---|---|---|---|
| 2020/0077094 A1* | 3/2020 | Poirier | H04N 19/167 |
| 2020/0195924 A1* | 6/2020 | Hsiang | H04N 19/119 |
| 2020/0236359 A1* | 7/2020 | Gao | H04N 19/46 |
| 2021/0014490 A1* | 1/2021 | Wieckowski | H04N 19/1883 |
| 2021/0084298 A1* | 3/2021 | Gao | H04N 19/1883 |

* cited by examiner

SYSTEMS AND METHODS FOR PARTITIONING VIDEO BLOCKS AT A BOUNDARY OF A PICTURE

TECHNICAL FIELD

This disclosure relates to video coding and more particularly to techniques for partitioning a picture of video data.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that are under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In one example, a method of partitioning video data for video coding, comprises receiving a video block including sample values, determining whether the video block is a fractional boundary video block and partitioning the sample values according to an inferred partitioning using a subset of available partition modes.

In one example, a method of reconstructing video data comprises receiving residual data corresponding to a coded video block including sample values, determining whether the coded video block is a fractional boundary video block, determining a partitioning for the coded video block according to an inferred partitioning using a subset of available partition modes, and reconstructing video data based on the residual data and the partitioning for the coded video block.

DESCRIPTION OF EMBODIMENTS

Figure 1:
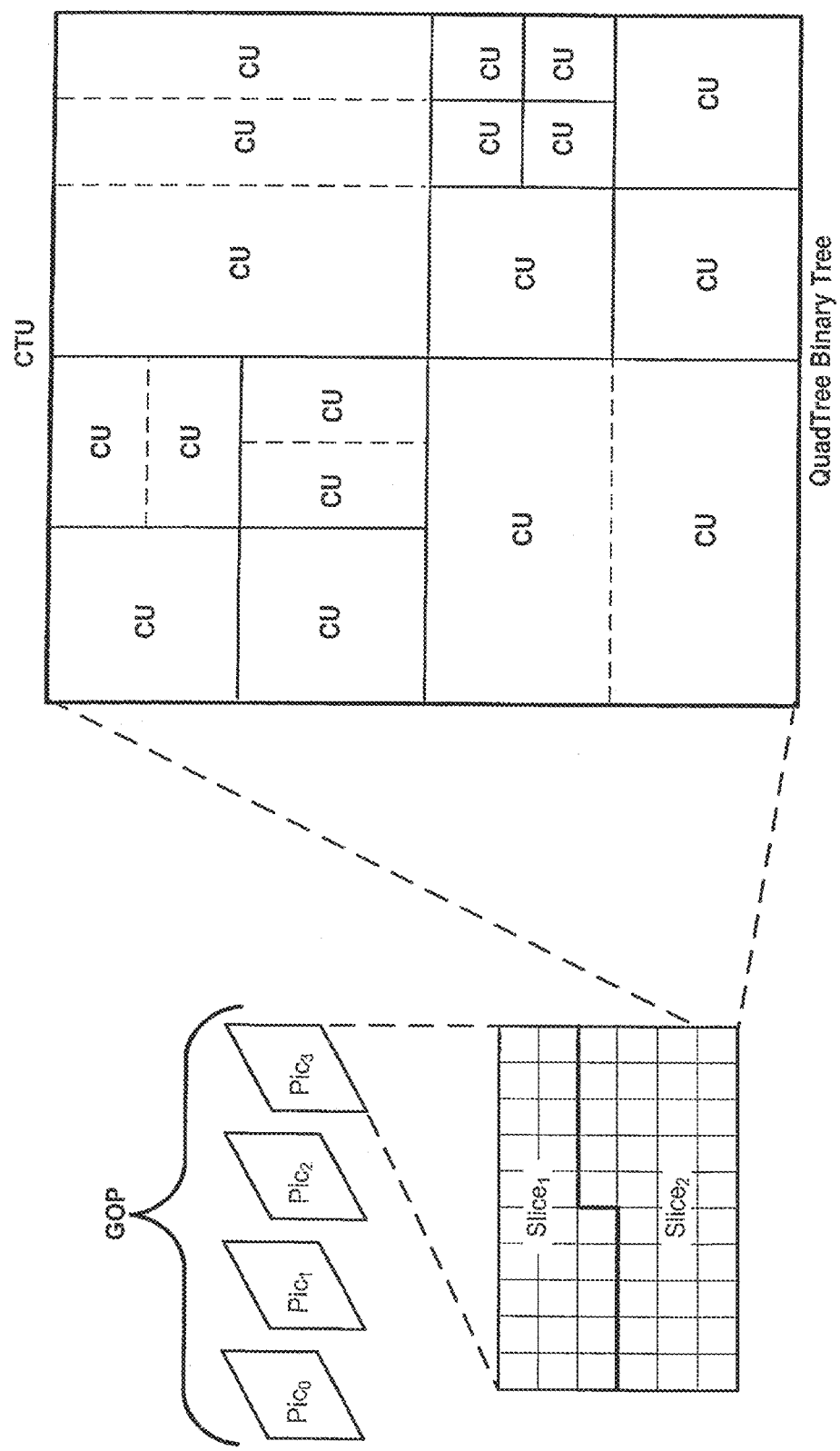
FIG. 1 is a conceptual diagram illustrating an example of a group of pictures coded according to a quad tree binary tree partitioning in accordance with one or more techniques of this disclosure.

In general, this disclosure describes various techniques for coding video data. In particular, this disclosure describes techniques for partitioning a picture of video data. It should be noted that although techniques of this disclosure are described with respect to ITU-T H.264, ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device for partitioning video data for video coding comprises one or more processors configured to receive a video block including sample values, determine whether the video block is a fractional boundary video block and partition the sample values according to an inferred partitioning using a subset of available partition modes.

In one example, a non-transitory computer-readable storage medium comprises instructions stored thereon that, when executed, cause one or more processors of a device to receive a video block including sample values, determine whether the video block is a fractional boundary video block, and partition the sample values according to an inferred partitioning using a subset of available partition modes.

In one example, an apparatus comprises means for receiving a video block including sample values, means for determining whether the video block is a fractional boundary video block and means for partitioning the sample values according to an inferred partitioning using a subset of available partition modes.

In one example, a device for reconstructing video data comprises one or more processors configured to receive residual data corresponding to a coded video block including sample values, determine whether the coded video block is a fractional boundary video block, determine a partitioning for the coded video block according to an inferred partitioning using a subset of available partition modes, and reconstruct video data based on the residual data and the partitioning for the coded video block.

In one example, a non-transitory computer-readable storage medium comprises instructions stored thereon that, when executed, cause one or more processors of a device to receive residual data corresponding to a coded video block including sample values, determine whether the coded video block is a fractional boundary video block, determine a partitioning for the coded video block according to an inferred partitioning using a subset of available partition modes, and reconstruct video data based on the residual data and the partitioning for the coded video block.

In one example, an apparatus comprises means for receiving residual data corresponding to a coded video block including sample values, means for determining whether the coded video block is a fractional boundary video block, means for determining a partitioning for the coded video block according to an inferred partitioning using a subset of available partition modes, and means for reconstructing video data based on the residual data and the partitioning for the coded video block.

The details of one or more examples are set forth in the accompanying drawings and the description below. Other features, objects, and advantages will be apparent from the description and drawings, and from the claims.

Video content typically includes video sequences comprised of a series of frames (or pictures). A series of frames may also be referred to as a group of pictures (GOP). Each video frame or picture may include a plurality of slices or tiles, where a slice or tile includes a plurality of video blocks. As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Video blocks may be ordered within a picture according to a scan pattern (e.g., a raster scan). A video encoder may perform predictive encoding on video blocks and sub-divisions thereof. Video blocks and sub-divisions thereof may be referred to as nodes.

ITU-T H.264 specifies a macroblock including 16×16 luma samples. That is, in ITU-T H.264, a picture is segmented into macroblocks. ITU-T H.265 specifies an analogous Coding Tree Unit (CTU) structure, which is also referred to as a largest coding unit (LCU). In ITU-T H.265, pictures are segmented into CTUs. In ITU-T H.265, for a picture, a CTU size may be set as including one of 16×16, 32×32, or 64×64 luma samples. In ITU-T H.265, a CTU is composed of respective Coding Tree Blocks (CTB) for each component of video data (e.g., luma (Y) and chroma (Cb and Cr). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB types include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

Figure 2:
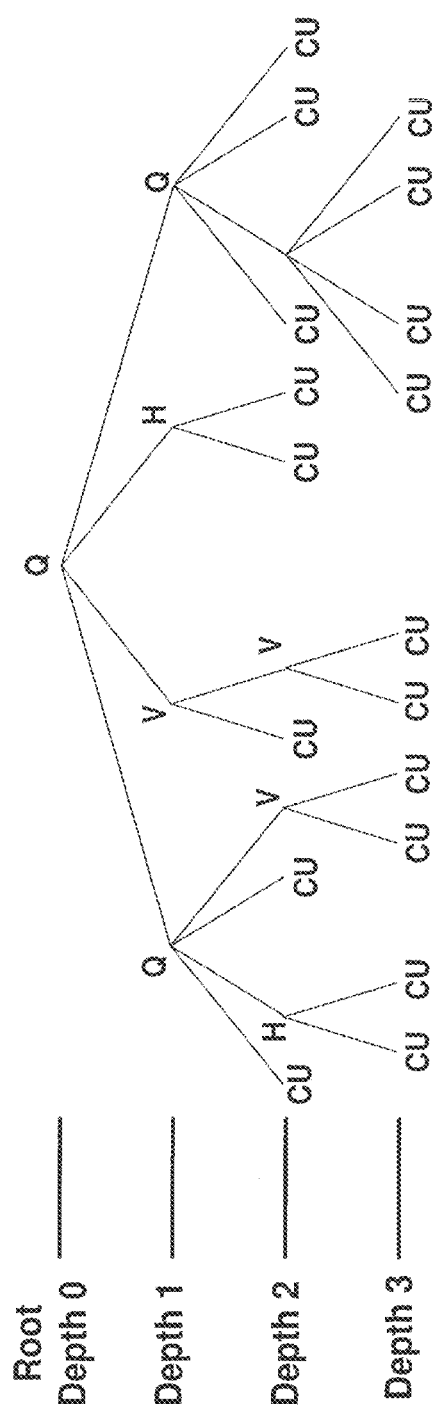
FIG. 2 is a conceptual diagram illustrating an example of a quad tree binary tree in accordance with one or more techniques of this disclosure.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. FIG. 1 illustrates an example of a CTU (e.g., a CTU having a size of 256×256 luma samples) being partitioned into quadtree leaf nodes and quadtree leaf nodes being further partitioned according to a binary tree. That is, in FIG. 1 dashed lines indicate additional binary tree partitions in a quadtree. Thus, the binary tree structure in JEM enables square and rectangular leaf nodes, where each leaf node includes a CB. As illustrated in FIG. 1, a picture included in a GOP may include slices, where each slice includes a sequence of CTUs and each CTU may be partitioned according to a QTBT structure. FIG. 1 illustrates an example of QTBT partitioning for one CTU included in a slice. FIG. 2 is a conceptual diagram illustrating an example of a QTBT corresponding to the example QTBT partition illustrated in FIG. 1. In JEM, a QTBT is signaled by signaling QT split flag and BT split mode syntax elements. When a QT split flag has a value of 1, a QT split is indicated. When a QT split flag has a value of 0, a BT split mode syntax element is signaled. When a BT split mode syntax element has a value of 0 (i.e., BT split mode coding tree =0), no binary splitting is indicated. When a BT split mode syntax element has a value of 1, a vertical split mode is indicated. When a BT split mode syntax element has a value of 2, a horizontal split mode is indicated. Further, BT splitting may be performed until a maximum BT depth is reached.

In FIG. 2, Q indicates a quadtree split, H indicates a horizontal binary split, V indicates a vertical binary split, and CU indicates a resulting CU leaf. As illustrated in FIG. 2, split indicators (e.g., QT split flag syntax elements and BT split mode syntax elements) are associated with a depth, where a depth of zero corresponds to a root of a QTBT and higher depth values correspond to subsequent depths beyond the root. It should be noted that in FIG. 2, the tree corresponds to a left-to-right z-scan. That is, for QT splits, tree nodes from left-to-right in the graph correspond to z-scan of the QT parts, for horizontal splits, tree nodes from left-to-right correspond to upper-to-lower scan of the parts, and for vertical splits, tree nodes from left-to-right correspond to left-to-right scan of the parts. Other example trees described herein may also utilize a left-to-right z-scan.

Figure 3:
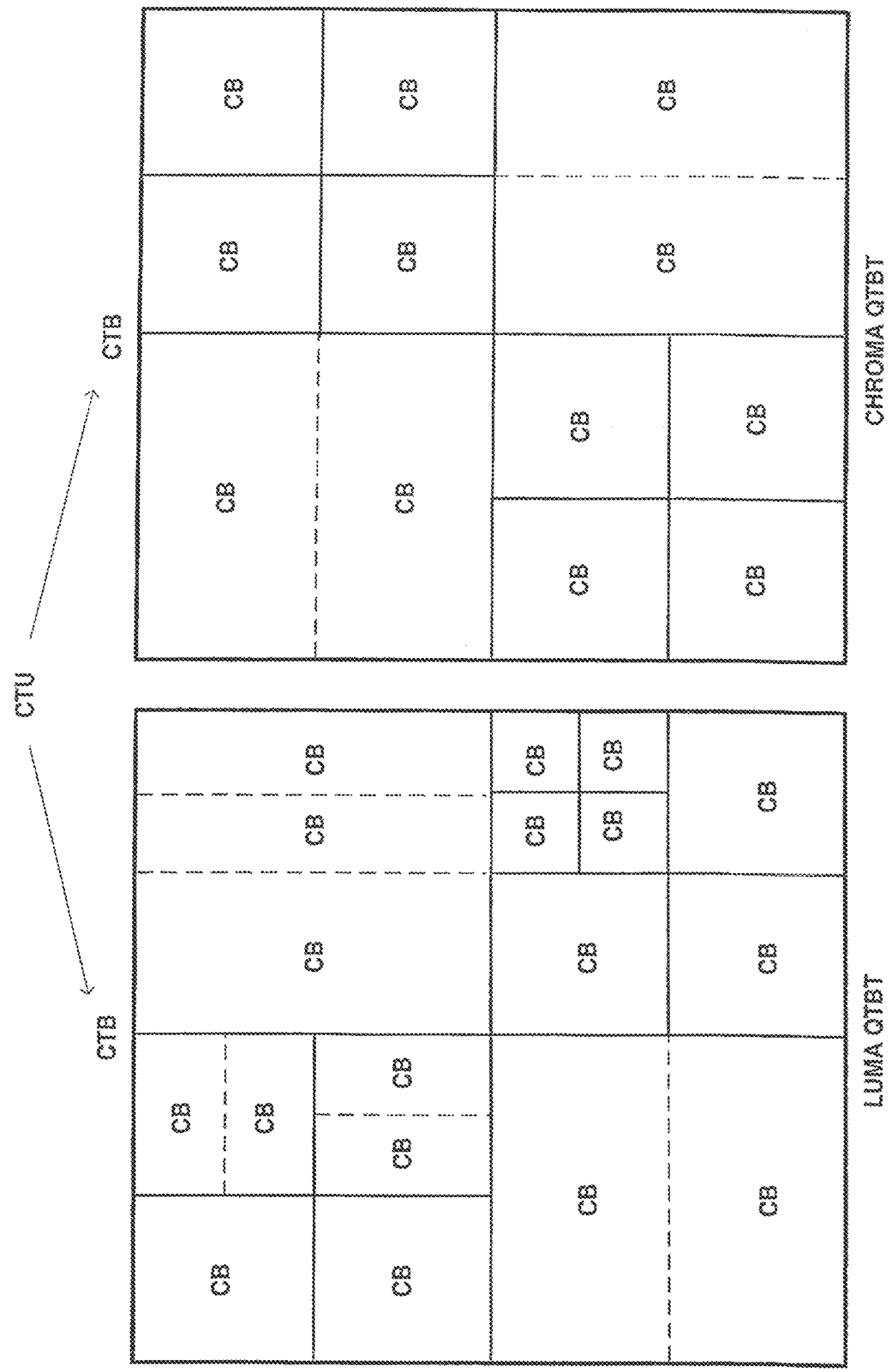
FIG. 3 is a conceptual diagram illustrating video component quad tree binary tree partitioning in accordance with one or more techniques of this disclosure.

Further, it should be noted that in JEM, luma and chroma components may have separate QTBT partitions. That is, in JEM luma and chroma components may be partitioned independently by signaling respective QTBTs. FIG. 3 illustrates an example of a CTU being partitioned according to a QTBT for a luma component and an independent QTBT for chroma components. As illustrated in FIG. 3, when independent QTBTs are used for partitioning a CTU, CBs of the luma component are not required to and do not necessarily align with CBs of chroma components. Currently, in JEM independent QTBT structures are enabled for slices using intra prediction techniques. It should be noted that in some cases, values of chroma variables may need to be derived from the associated luma variable values. In these cases, the sample position in chroma and chroma format may be used to determine the corresponding sample position in luma to determine the associated luma variable value.

Additionally, it should be noted that JEM includes the following parameters for signaling of a QTBT tree:

CTU size: the root node size of a quadtree. (e.g., 256×256, 128×128, 64×64, 32×32, 16×16 luma samples);

MinQTSize: the minimum allowed quadtree leaf node size (e.g., 16×16, 8×8 luma samples);

MaxBTSize: the maximum allowed binary tree root node size, i.e., the maximum size of a leaf quadtree node that may be partitioned by binary splitting (e.g., 64×64 luma samples);

MaxBTDepth: the maximum allowed binary tree depth, i.e., the lowest level at which binary splitting may occur, where the quadtree leaf node is the root (e.g., 3);

MinBTSize: the minimum allowed binary tree leaf node size; the minimum width or height of a binary leaf node (e.g., 4 luma samples).

It should be noted that in some examples, MinQTSize, MaxBTSize, MaxBTDepth, and/or MinBTSize may be different for the different components of video.

In JEM, CBs are used for prediction without any further partitioning. That is, in JEM, a CB may be a block of sample values on which the same prediction is applied. Thus, a JEM QTBT leaf node may be analogous a PB in ITU-T H.265.

Figure 4:
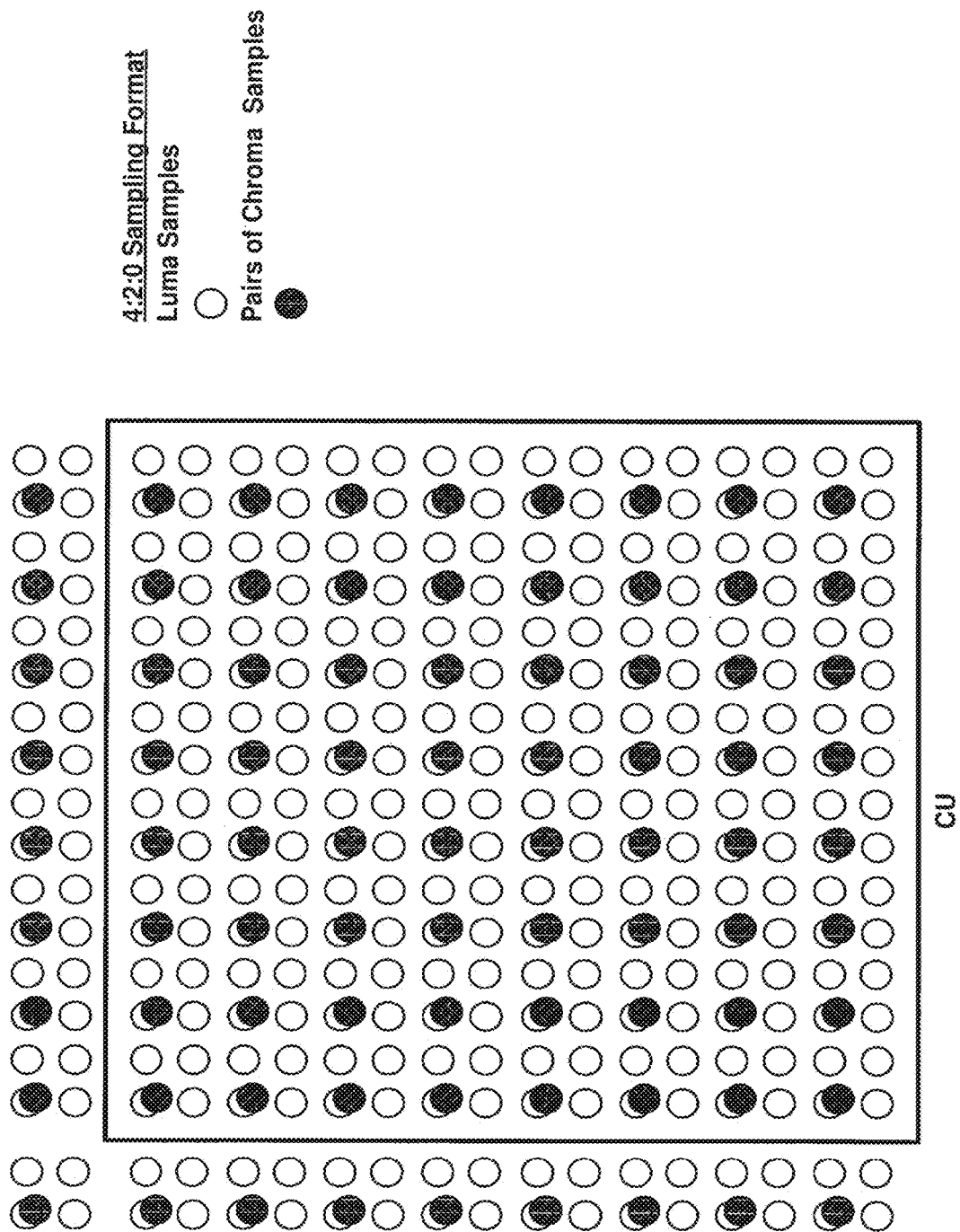
FIG. 4 is a conceptual diagram illustrating an example of a video component sampling format in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 4 is a conceptual diagram illustrating an example of a coding unit formatted according to a 4:2:0 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:0 sample format includes 16×16 samples of luma components and 8×8 samples for each chroma component. Further, in the example illustrated in FIG. 4, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

Figure 5:
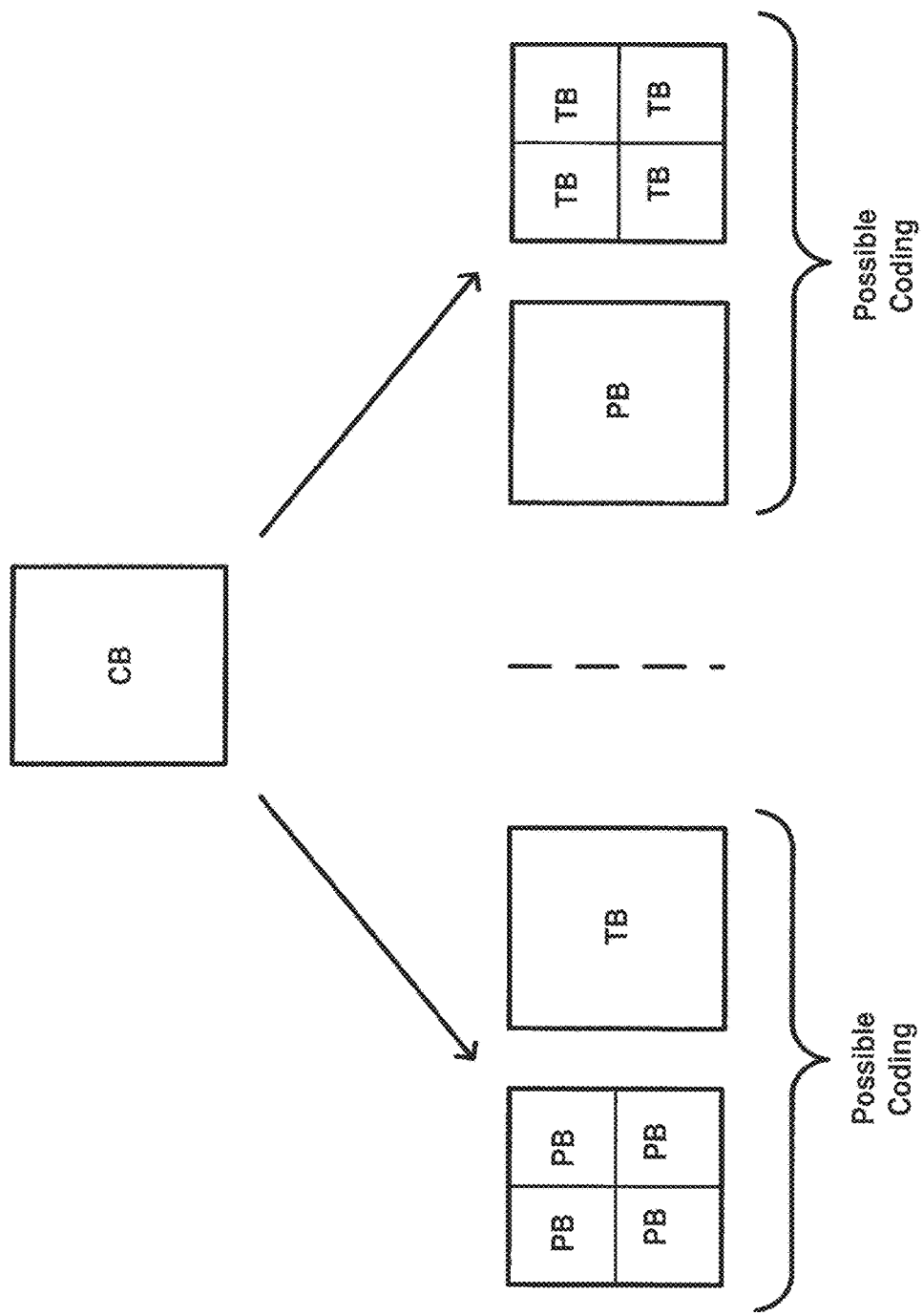
FIG. 5 is a conceptual diagram illustrating possible coding structures for a block of video data according to one or more techniques of this disclosure.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265, a CU is associated with a transform unit (TU) structure having its root at the CU level. That is, in ITU-T H.265, an array of difference values may be sub-divided for purposes of generating transform coefficients (e.g., four 8×8 transforms may be applied to a 16×16 array of residual values). For each component of video data, such sub-divisions of difference values may be referred to as Transform Blocks (TBs). It should be noted that in ITU-T H.265, TBs are not necessarily aligned with PBs. FIG. 5 illustrates examples of alternative PB and TB combinations that may be used for coding a particular CB. Further, it should be noted that in ITU-T H.265, TBs may have the following sizes 4×4, 8×8, 16×16, and 32×32.

It should be noted that in JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization essentially scales transform coefficients in order to vary the amount of data required to represent a group of transform coefficients. Quantization may generally include division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases.

Figure 6A:
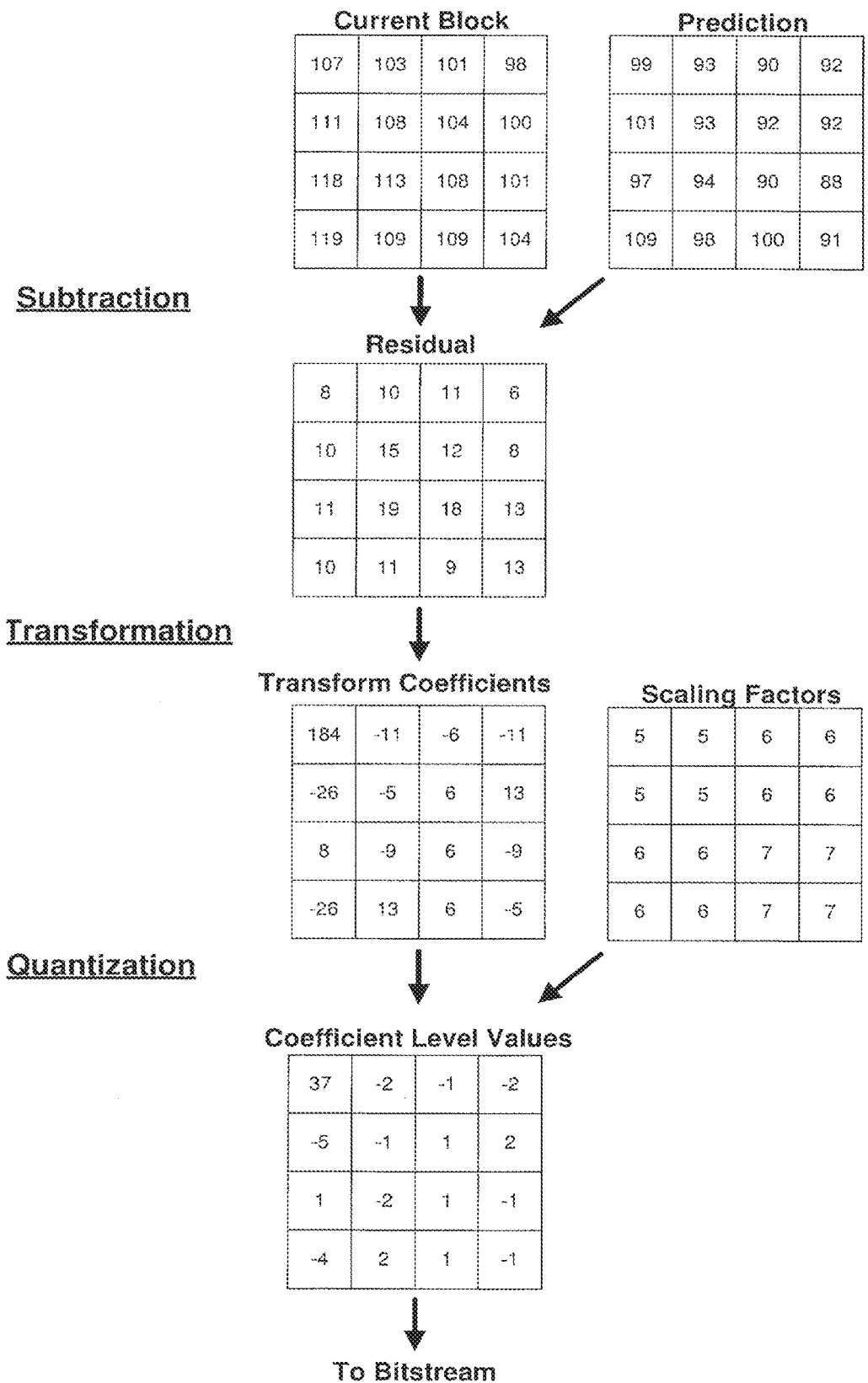
FIG. 6A is a conceptual diagram illustrating an example of coding a block of video data in accordance with one or more techniques of this disclosure.
Figure 6B:
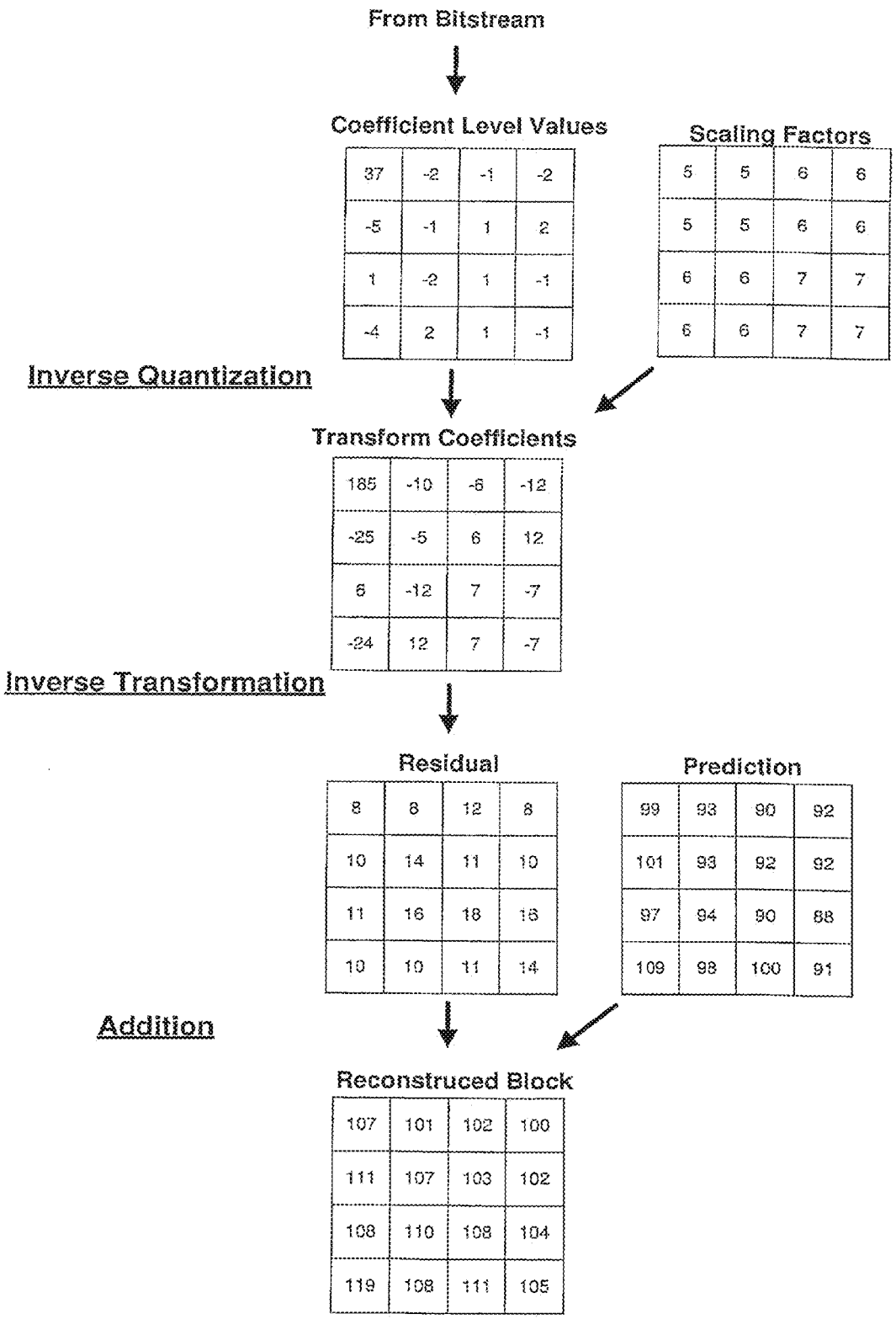
FIG. 6B is a conceptual diagram illustrating an example of coding a block of video data in accordance with one or more techniques of this disclosure.

FIGS. 6A-6B are conceptual diagrams illustrating examples of coding a block of video data. As illustrated in FIG. 6A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 6B, the current block of video data is decoded by performing inverse quantization on level values, performing an inverse transform, and adding a set of prediction values to the resulting residual. It should be noted that in the examples in FIGS. 6A-6B, the sample values of the reconstructed block differs from the sample values of the current video block that is encoded. In this manner, coding may said to be lossy. However, the difference in sample values may be considered acceptable or imperceptible to a viewer of the reconstructed video. Further, as illustrated in FIGS. 6A-6B, scaling is performed using an array of scaling factors.

As illustrated in FIG. 6A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin and a 0.3 probability of coding a 1-valued bin. It should be noted that in some cases the probability of coding a 0-valued bin and probability of coding a 1-valued bin may not sum to 1. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that according to ITU-T H.265, a CABAC entropy encoder may be implemented, such that some syntax elements may be entropy encoded using arithmetic encoding without the usage of an explicitly assigned context model, such coding may be referred to as bypass coding.

As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP).

Figure 7:
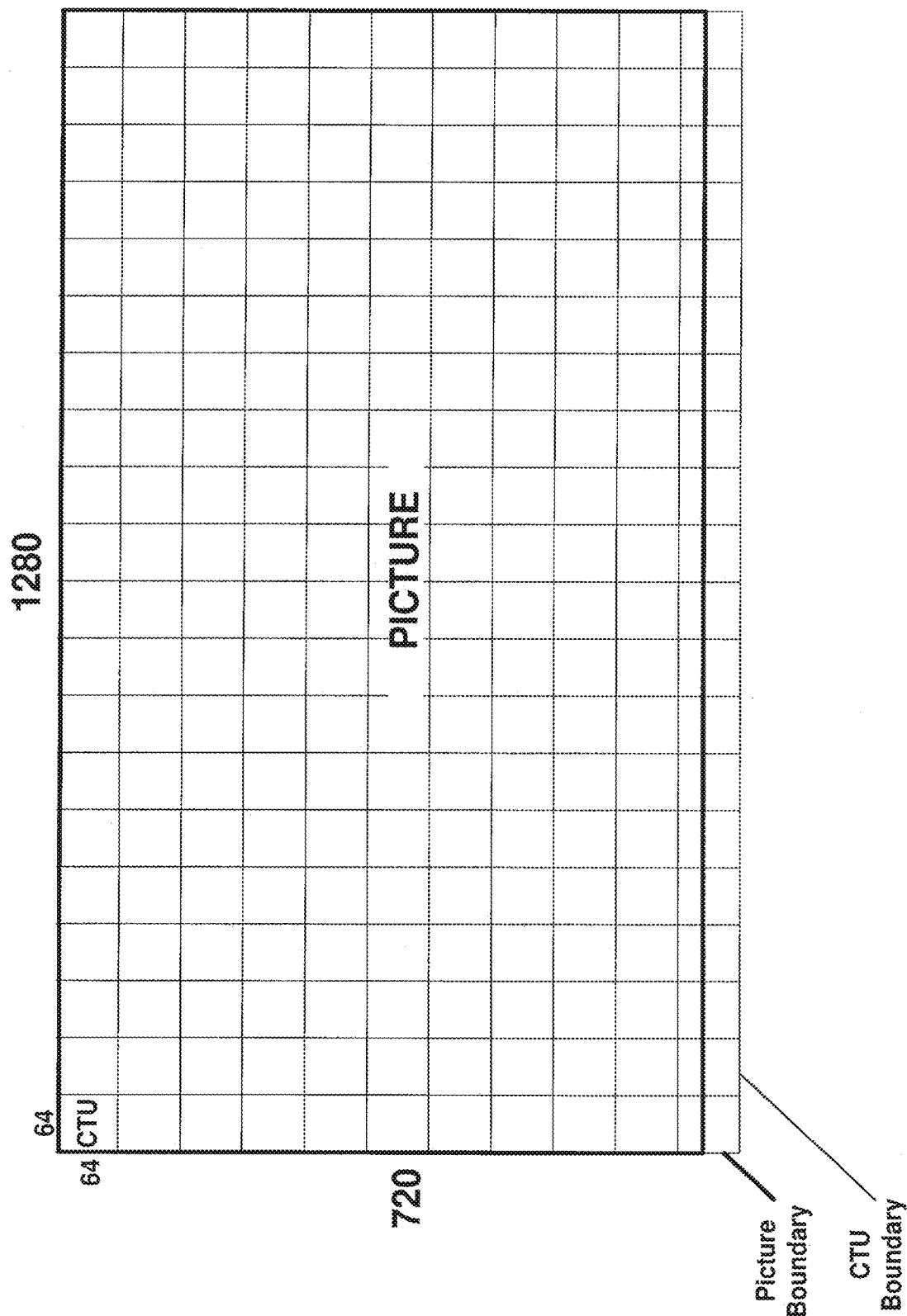
FIG. 7 is a conceptual diagram illustrating an example of a picture partitioned into coding units in accordance with one or more techniques of this disclosure.

As described above, during video coding, a picture may be segmented or partitioned into a basic coding unit, e.g., 16×16 marcoblocks in ITU-T H.264; 16×16, 32×32, or 64×64 CTUs in H.265; and 16×16, 32×32, 64×64, 128×128, or 256×256 CTUs in JEM. Video sequences may have various video properties including, for example, frame rates and picture resolutions. For example, so-called high-definition (HD) video sequences may include pictures having resolutions of 1980×1080 pixels or 1280×720 pixels. Further, example so-called ultra-high-definition (UHD) video sequences may include pictures having resolutions of 3840× 2160 pixels or 7680×4320 pixels. Further, video sequences include pictures having various other resolutions. Thus, in some cases, depending on the size of a picture and the size of a basic coding unit (e.g., CTU size), the width and/or height of a picture may not be divisible into an integer number of basic coding units. FIG. 7 illustrates an example of a 1280×720 picture partitioned into 64×64 CTUs. As illustrated in FIG. 7, the bottom row of CTUs does not align with the bottom picture boundary. That is, only 16 rows of samples in the bottom row CTUs fit within the picture boundary (720 divided by 64 is 11 with a remainder of 16). As used herein, the term, fractional boundary video block, fractional boundary CTU, fractional boundary LCU, or fractional boundary coding unit may be used to refer to a video block in a boundary column and/or row of a picture having only a portion thereof within the picture boundary. It should be noted that boundary columns and boundary rows may include slice, tile, and/or picture boundaries. Further, it should be noted that in some cases, (e.g., omnidirectional video or so-called wraparound video), a boundary columns may include a left boundary and a boundary row may include a top row.

Figure 8:
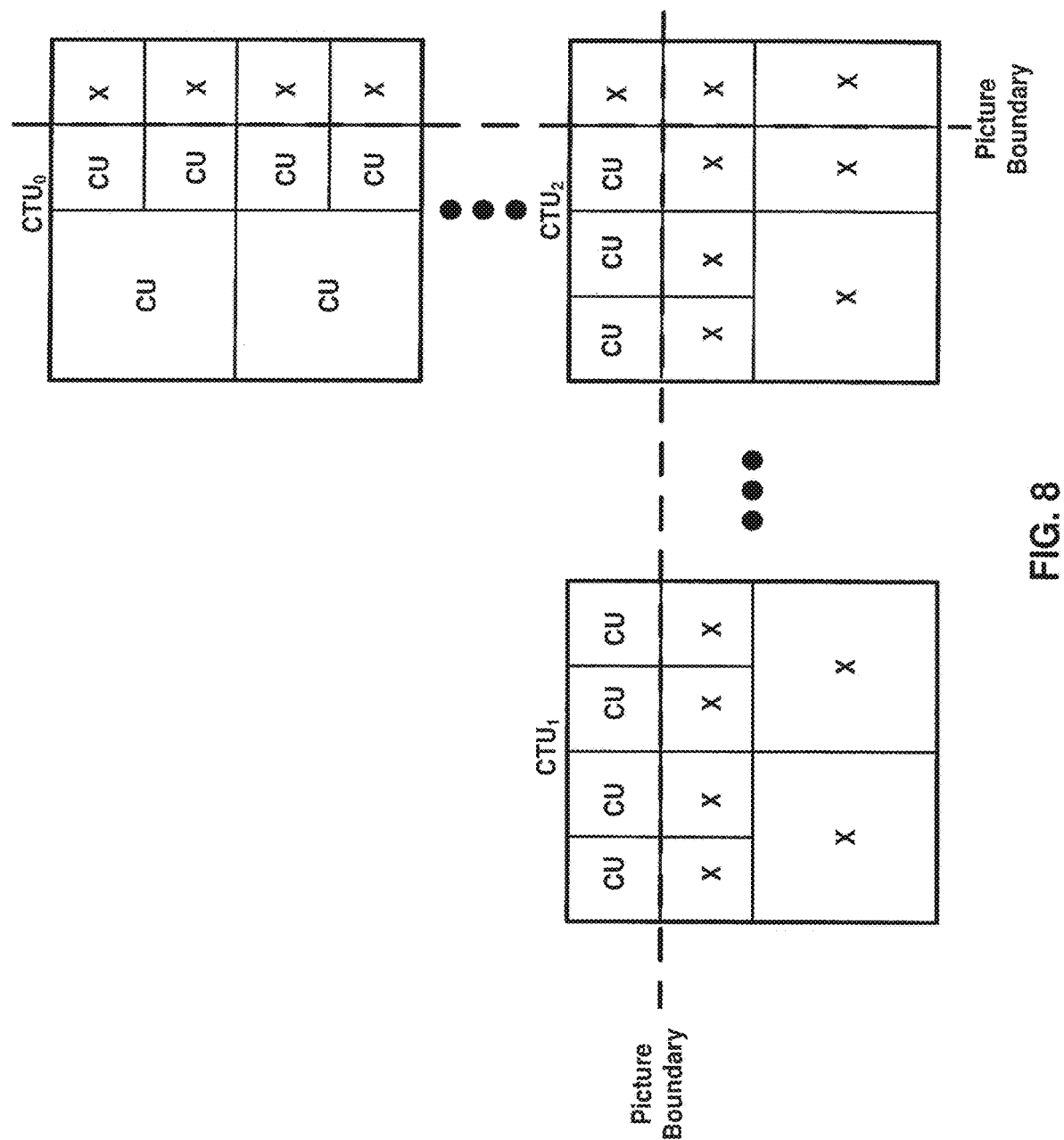
FIG. 8 is a conceptual diagram illustrating examples of quad tree partitioning for coding units occurring at picture boundaries in accordance with one or more techniques of this disclosure.

Typically, for example, in ITU-T H.265, fractional boundary video blocks are partitioned in a predefined manner, that is, an inferred partitioning occurs without signaling split indicators. Typically, an inferred partitioning is a partitioning that occurs to the depth where CUs that align with the picture boundary are formed. For example, referring to FIG. 7, an inferred partitioning of a bottom row CTU may include an inferred QT partitioning resulting in a row of four 16×16 CUs at the top of the CTU, where the row of four 16×16 CUs is included within the picture boundary. FIG. 8 is a conceptual diagram illustrating examples of inferred QT partitions for example fractional boundary video blocks. It should be noted that in FIG. 8 X's correspond to nodes resulting from a partition that are outside of the picture boundary. Referring to the example illustrated in FIG. 8, the partitioning of the $CTU_1$ may correspond to the described example inferred partitioning of a bottom row CTU in FIG. 7. It should be noted that in some examples, the CUs within the picture boundary resulting from an inferred partitioning may be further partitioned. For example, referring to the $CTU_0$ in FIG. 8, in some examples, the six CUs of the CTU within vertical picture boundary may be further partitioned.

It should be noted, as illustrated in FIG. 8, that partitioning fractional boundary video blocks in a predefined manner may result in a relatively large number of relatively small video blocks (e.g., CUs) occurring at or near a picture boundary. Having a relatively large number of relatively small video blocks occurring at or near a picture boundary may adversely impact coding efficiency, due to each video block requiring the transmission/parsing of syntax elements associated with the video block coding structure. For example, as described above, in ITU-T H.265, a CU forms the root of a PU and TU and thus each CU is associated with PU and TU coding structures (i.e., semantics and syntax elements).

Figure 9:
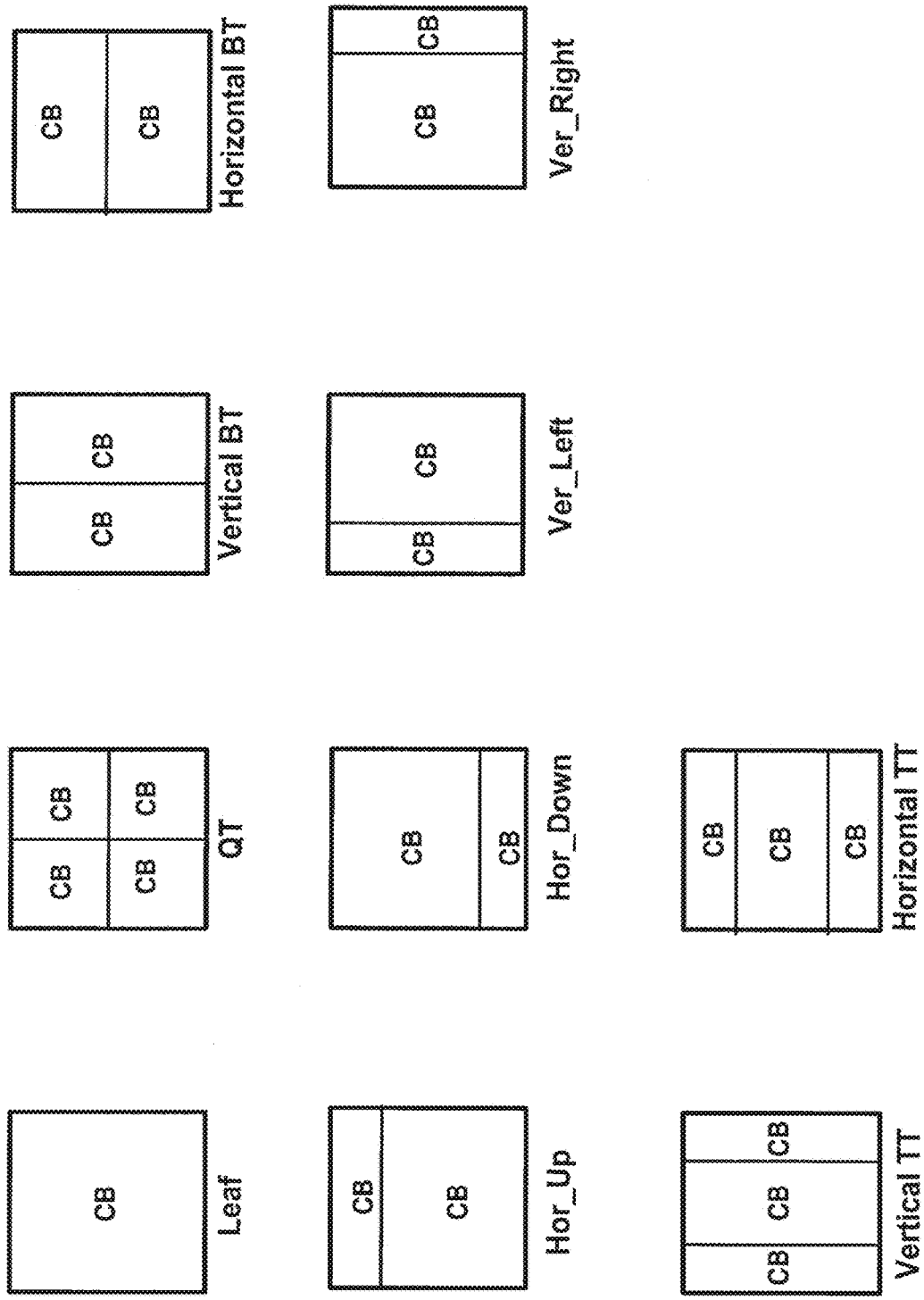
FIG. 9 is a conceptual diagram illustrating partitioning modes in accordance with one or more techniques of this disclosure.

Further, it should be noted that with respect to JEM, techniques have been proposed for partitioning CUs according to asymmetric binary tree partitioning. F. Le Leannec, et al., "Asymmetric Coding Units in QTBT," $4^{th}$ Meeting: Chengdu, CN, 15-21 Oct. 2016, Doc. JVET-D0064 (hereinafter "Le Leannec"), describes where in addition to the symmetric vertical and horizontal BT split modes, four additional asymmetric BT split modes are defined. In Le Leannec, the four additionally defined BT split modes for a CU include: horizontal partitioning at one quarter of the height (at the top for one mode or at the bottom for one mode) or vertical partitioning at one quarter of the width (at the left for one mode or the right for one mode). The four additionally defined BT split modes in Le Leannec are illustrated in FIG. 9 as Hor_Up, Hor_Down, Ver_Left, and Ver_Right.

Further, Li, et al., "Multi-Type-Tree," $4^{th}$ Meeting: Chengdu, CN, 15-21 Oct. 2016, Doc. JVET-D0117r1 (hereinafter "Li"), describes an example where in addition to the symmetric vertical and horizontal BT split modes, two additional triple tree (TT) split modes are defined. It should be noted that partitioning a node into three blocks about a direction may be referred to as triple tree (TT) partitioning. Thus, split types may include horizontal and vertical binary splits and horizontal and vertical TT splits. In Li, the two additionally defined TT split modes for a node include: (1) horizontal TT partitioning at one quarter of the height from the top edge and the bottom edge of a node; and (2) vertical TT partitioning at one quarter of the width from the left edge and the right edge of a node. The two additionally defined TT split modes in Li are illustrated in FIG. 9 as Vertical TT and Horizontal TT.

Figure 10:
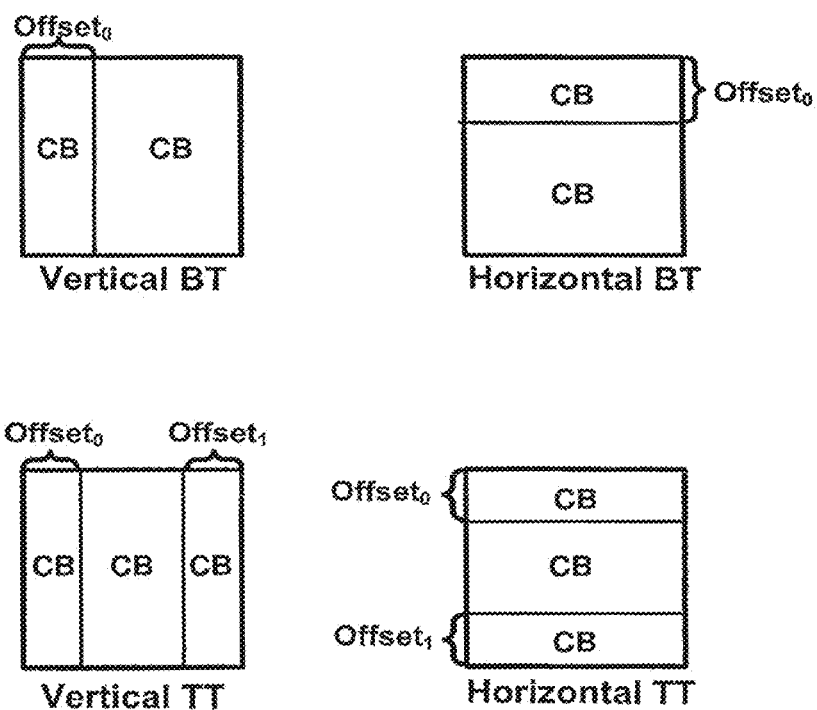
FIG. 10 is a conceptual diagram illustrating partitioning modes in accordance with one or more techniques of this disclosure.

It should be noted that the example partitioning split modes described in Le Leannec and Li may be generally described as predefined split modes. More generally, according to the techniques described herein, partitioning a node according to a BT and TT split modes may include arbitrary BT and TT splitting. For example, referring to FIG. 10, the offsets corresponding to a BT split ($Offset_1$) and a TT split ($Offset_1$ and $Offset_2$) may be arbitrary instead of occurring at the predefined locations in Le Leannec and Li. There may be various techniques in which to arbitrary offsets may be inferred and/or signaled. For example, for nodes having a size less than or equal to a threshold, a predefined offset may be inferred and for nodes of having a size greater than the threshold, an arbitrary offset may be signaled.

Figure 11:
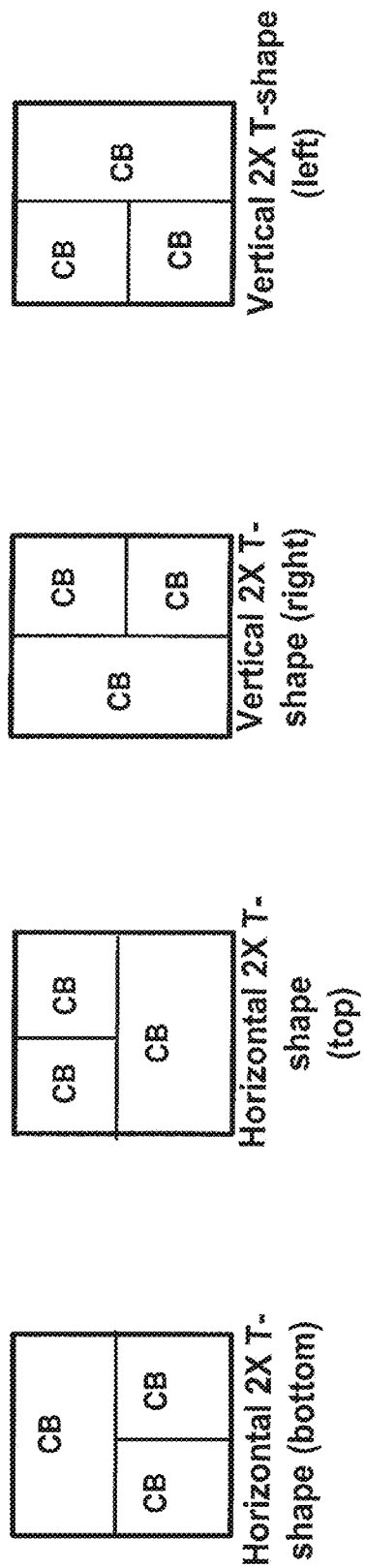
FIG. 11 is a conceptual diagram illustrating partitioning modes in accordance with one or more techniques of this disclosure.

In addition to BT and TT split types, T-shape split types may be defined. FIG. 11 illustrates examples of T-shape partitioning. As illustrated in FIG. 11, T-shape partitioning includes first partitioning a block according to a BT partition and further partitioning one of the resulting blocks according to the BT partition having a perpendicular orientation. As illustrated, a T-shape split results in three blocks. In the example illustrated in FIG. 11, the T-shape splits are described as 2X T-shapes, where 2X T-shape partitioning may refer to a case where a T-shape partition is generated using two symmetric BT splits. Further, in FIG. 11, T-shape splits are defined based on which of the blocks resulting after the first partition is further partitioned (e.g., top or bottom for horizontal T-shapes and left or right for vertical T-shapes). Thus, the example T-shape split types in FIG. 11, may be described as being predefined. In a manner similar to that described above, with respect to BT and TT split types, according to the techniques described herein, partitioning a node according to a T-shape split modes may include arbitrary T-shape splitting. It should be noted that in other examples, other partition modes may be defined, for example, a quad split about a single vertical or horizontal direction (e.g., partitioning a square into four parallel equally sized rectangles). As described above, automatically partitioning fractional boundary video blocks may adversely impact coding efficiency. Further, current techniques for partitioning fractional boundary video blocks may be less than ideal when various partition modes are available for partitioning a node.

Figure 12:
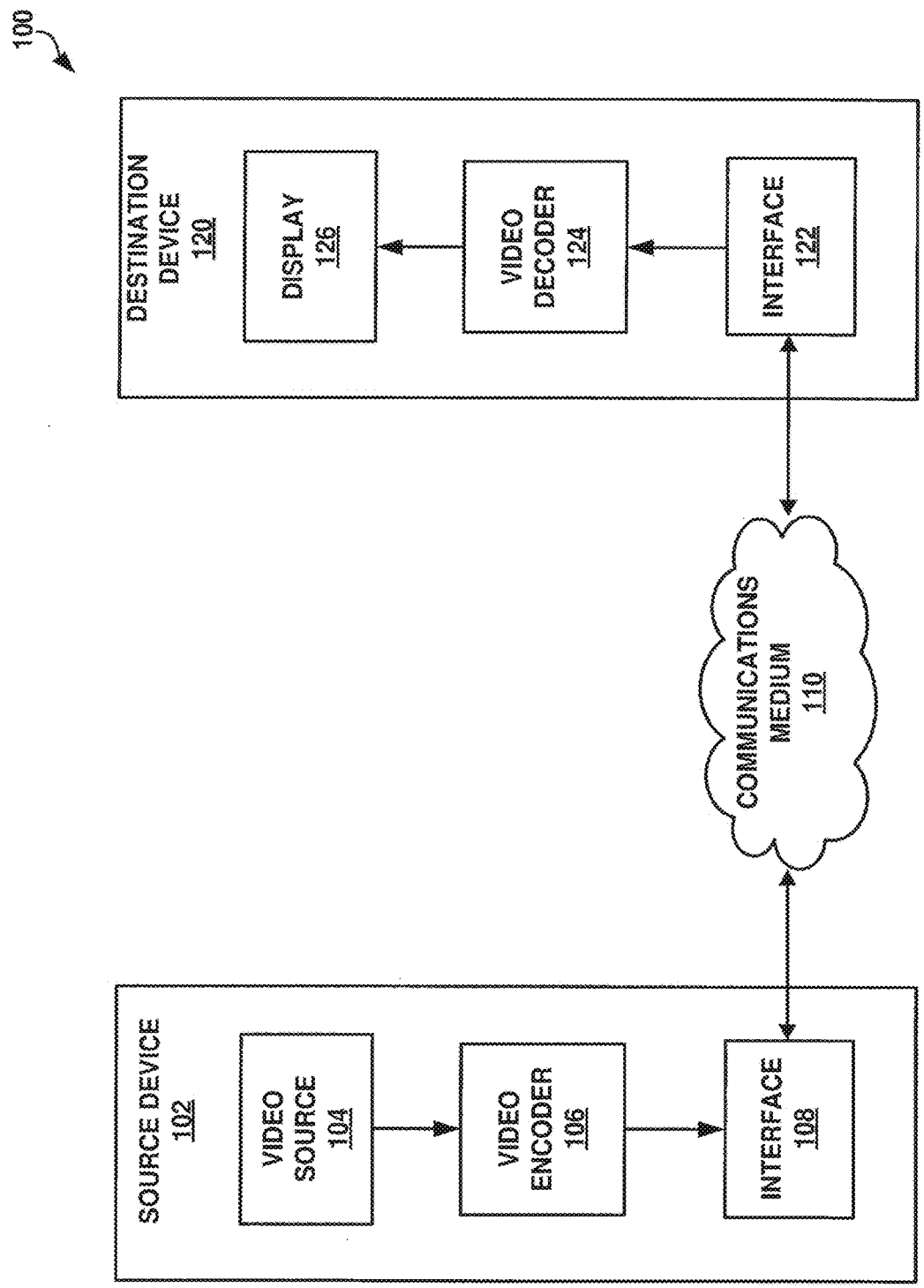
FIG. 12 is a block diagram illustrating an example of a system that may be configured to encode and decode video data according to one or more techniques of this disclosure.

FIG. 12 is a block diagram illustrating an example of a system that may be configured to code (i.e., encode and/or decode) video data according to one or more techniques of this disclosure. System 100 represents an example of a system that may perform video coding using partitioning techniques described according to one or more techniques of this disclosure. As illustrated in FIG. 12, system 100 includes source device 102, communications medium 110, and destination device 120. In the example illustrated in FIG. 12, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 12, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 12, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 12, video decoder 124 is described as outputting data to display 126, video decoder 124 may be configured to output video data to various types of devices and/or sub-components thereof. For example, video decoder 124 may be configured to output video data to any communication medium, as described herein.

Figure 13:
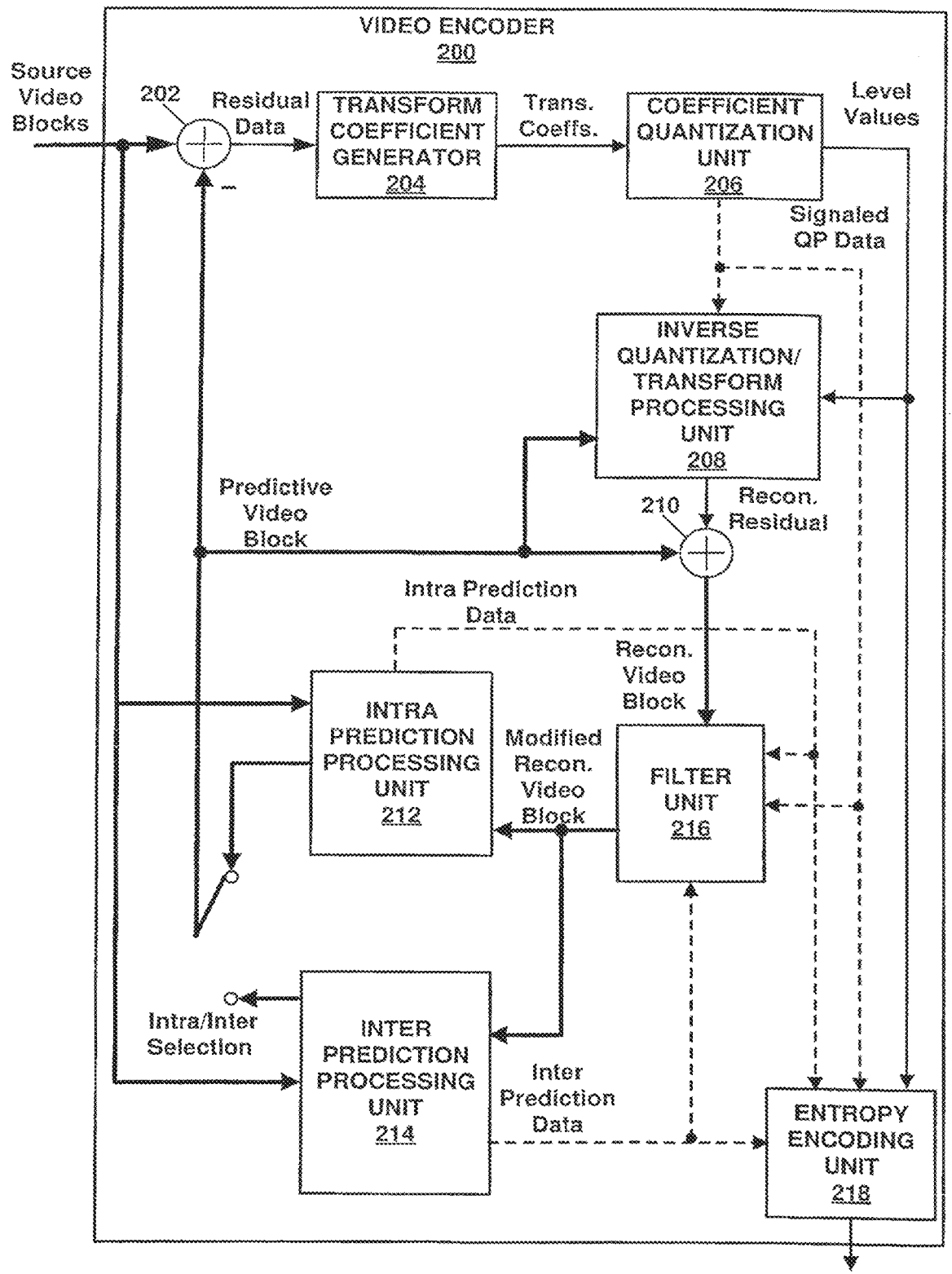
FIG. 13 is a block diagram illustrating an example of a video encoder that may be configured to encode video data according to one or more techniques of this disclosure.

FIG. 13 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 13, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 13, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 13, video encoder 200 receives source video blocks and outputs a bitstream. As described above, current techniques for partitioning fractional boundary video blocks may be less than ideal. According to the techniques described herein, video encoder 200 may be configured to apply a predefined partitioning to a fractional boundary video block that minimizes the impact on coding efficiency.

Figure 14A:
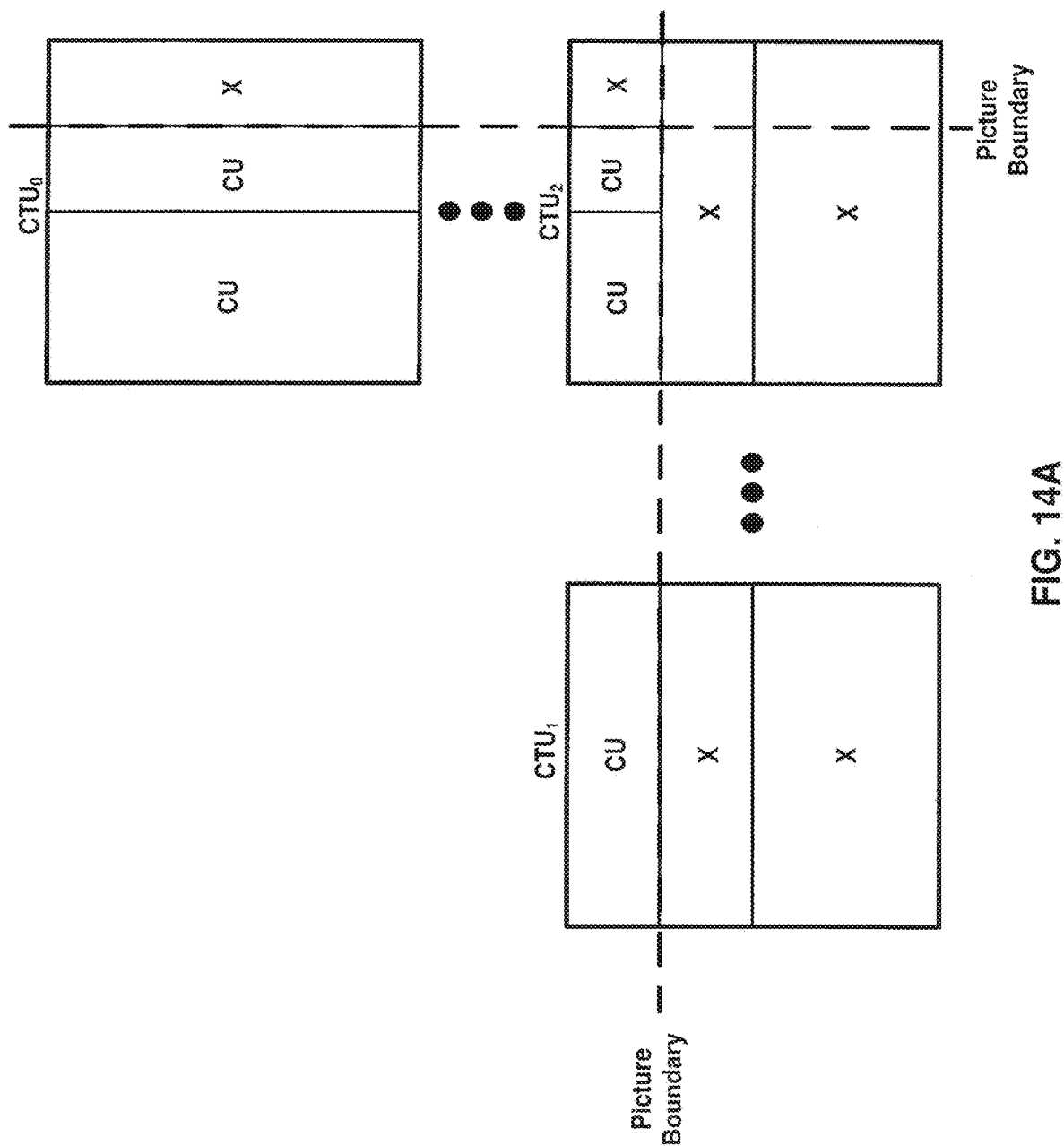
FIG. 14A is a conceptual diagram illustrating an example of partitioning for coding units occurring at picture boundaries in accordance with one or more techniques of this disclosure.
Figure 14B:
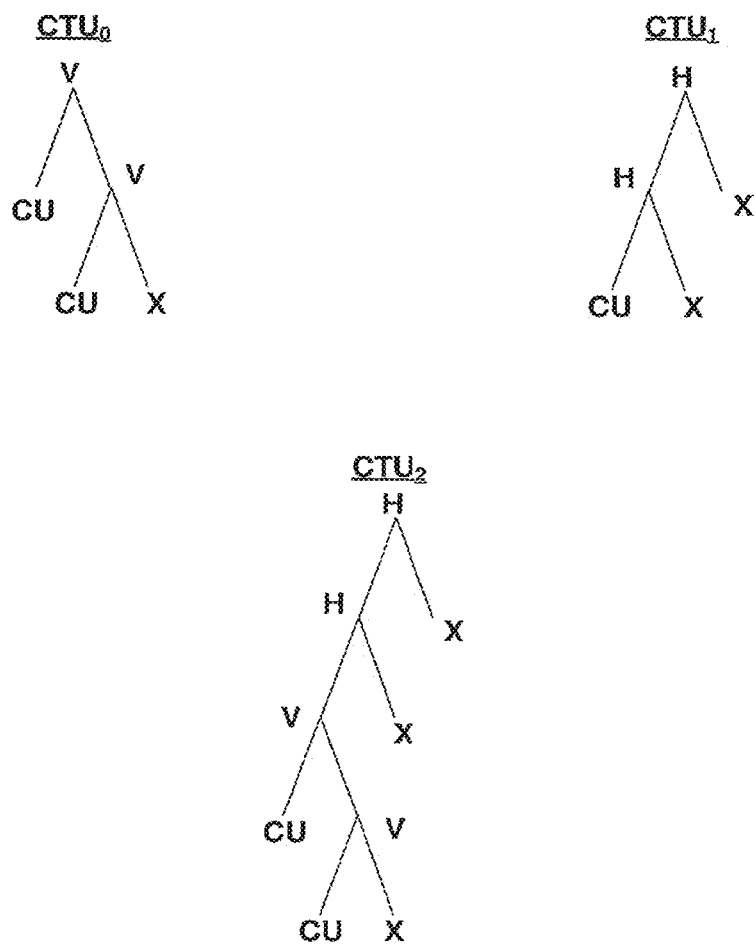
FIG. 14B is a conceptual diagram illustrating an example of partitioning for coding units occurring at picture boundaries in accordance with one or more techniques of this disclosure.
Figure 14C:
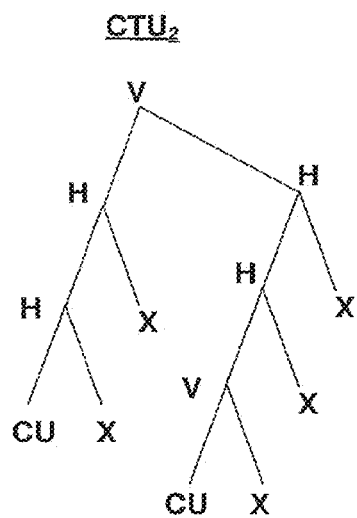
FIG. 14C is a conceptual diagram illustrating an example of partitioning for coding units occurring at picture boundaries in accordance with one or more techniques of this disclosure.

In one example, according to the techniques described herein video encoder 200 may be configured to apply a predefined partitioning to a fractional boundary video block, where the predefined partitioning uses a combination of symmetric vertical and horizontal BT split modes to generate CUs within the picture boundaries. That is, in one example, fractional boundary video block are partitioned using only symmetric vertical and horizontal BT split modes regardless of the partitioning modes available for partitioning video blocks. FIG. 14A is a conceptual diagram illustrating examples of predefined symmetric vertical and horizontal BT split modes partitions for example fractional boundary video blocks. FIG. 14B is a conceptual diagram illustrating an example of an inferred partitioning tree corresponding to the predefined partition illustrated in FIG. 14A. It should be noted that alternative inferred partitioning trees may be used to generate the resulting predefined partition of $CTU_2$. FIG. 14C illustrates an example of an alternative inferred partitioning tree. It should be noted that in some examples, the CUs illustrated in FIG. 14A within the picture boundary resulting from the inferred partitioning may be further partitioned and in some examples, the CUs illustrated in FIG. 14A within the picture boundary resulting from the inferred partitioning may not be further partitioned. It should be noted that the example predefined partitions illustrated in FIG. 14A result in fewer and larger corresponding CUs within the picture boundary than the example predefined partitions illustrated in FIG. 8.

Figure 15A:
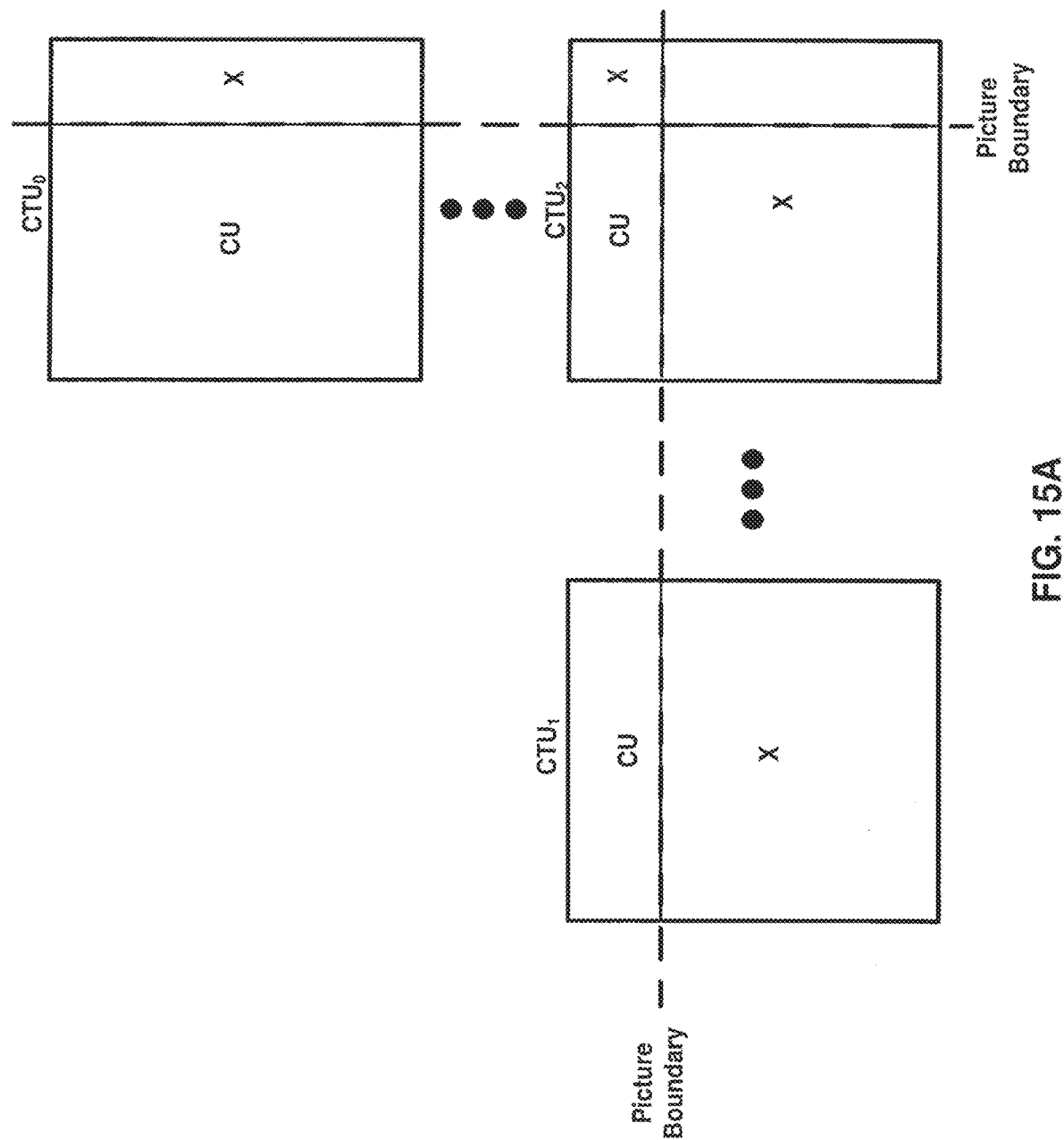
FIG. 15A is a conceptual diagram illustrating an example of partitioning for coding units occurring at picture boundaries in accordance with one or more techniques of this disclosure.
Figure 15B:
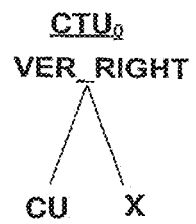
FIG. 15B is a conceptual diagram illustrating an example of partitioning for coding units occurring at picture boundaries in accordance with one or more techniques of this disclosure.
Figure 15B:
Figure 15B:
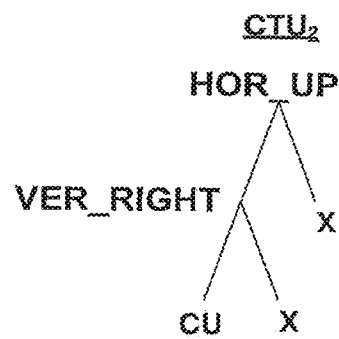
Figure 15C:
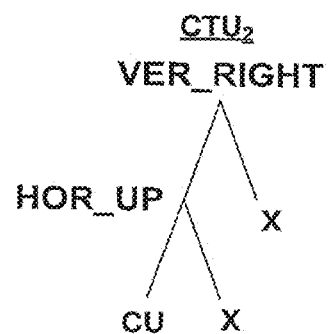
FIG. 15C is a conceptual diagram illustrating an example of partitioning for coding units occurring at picture boundaries in accordance with one or more techniques of this disclosure.

In one example, according to the techniques described herein video encoder 200 may be configured to apply a predefined partitioning to a fractional boundary video block, where the predefined partitioning uses a combination of asymmetric vertical and horizontal BT split modes to generate CUs within the picture boundaries. That is, in one example, fractional boundary video block are partitioned using only asymmetric vertical and horizontal BT split modes regardless of the partitioning modes available for partitioning video blocks. In one example, the asymmetric vertical and horizontal BT split modes may include: horizontal partitioning at one quarter of the height (at the top for one mode or at the bottom for one mode) or vertical partitioning at one quarter of the width (at the left for one mode or the right for one mode). FIG. 15A is a conceptual diagram illustrating examples of predefined asymmetric vertical and horizontal BT split modes partitions for example fractional boundary video blocks. FIG. 15B is a conceptual diagram illustrating an example of an inferred partitioning tree corresponding to the predefined partition illustrated in FIG. 15A. It should be noted that alternative inferred partitioning trees may be used to generate the resulting predefined partition of $CTU_2$. FIG. 15C illustrates an example of an alternative inferred partitioning tree. It should be noted that in some examples, the CUs illustrated in FIG. 15A within the picture boundary resulting from the inferred partitioning may be further partitioned and in some examples, the CUs illustrated in FIG. 15A within the picture boundary resulting from the inferred partitioning may not be further partitioned. It should be noted that the example predefined partitions illustrated in FIG. 15A result in fewer and larger corresponding CUs within the picture boundary than the example predefined partitions illustrated in FIG. 8.

Figure 16A:
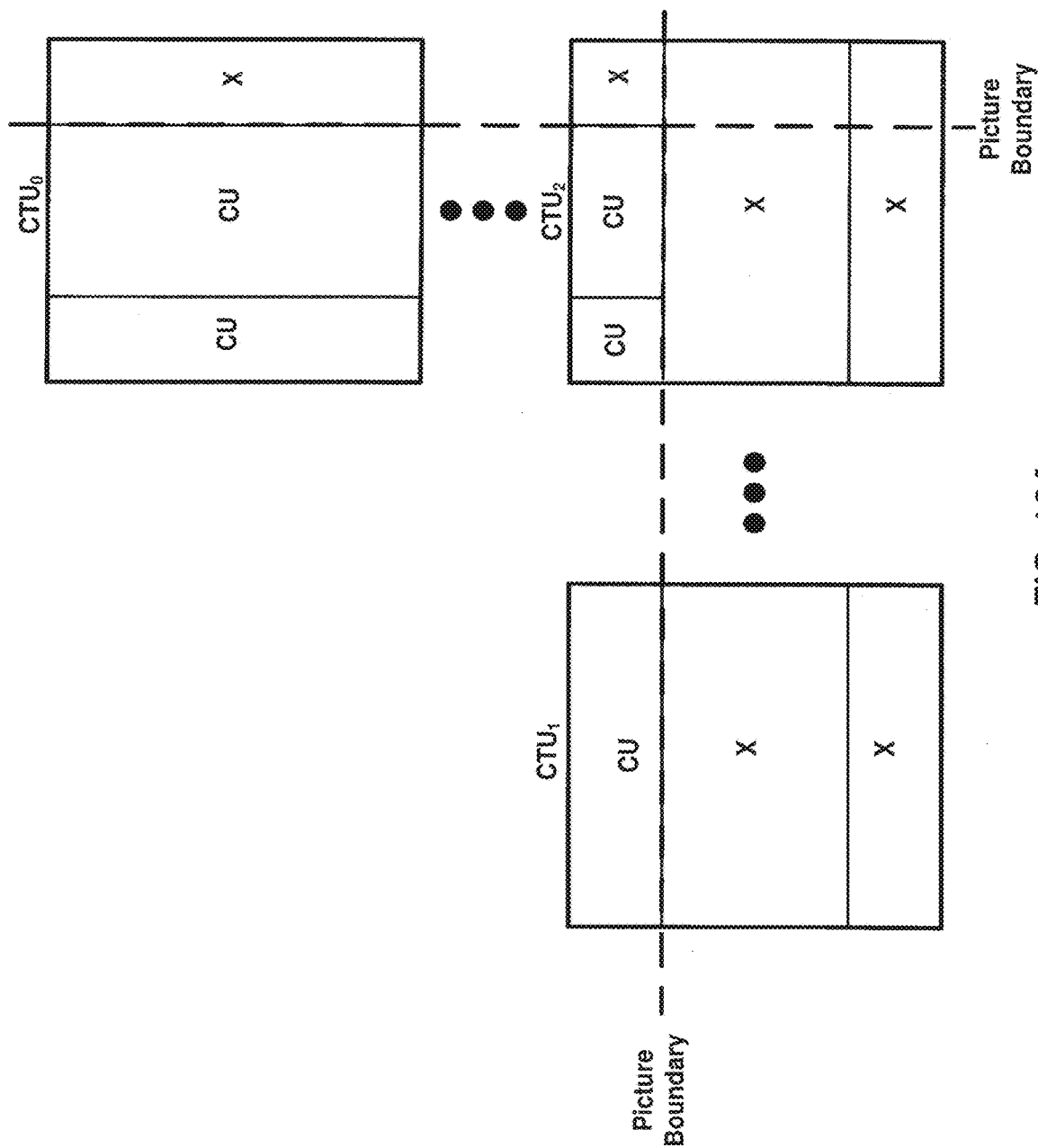
FIG. 16A is a conceptual diagram illustrating an example of partitioning for coding units occurring at picture boundaries in accordance with one or more techniques of this disclosure.
Figure 16B:
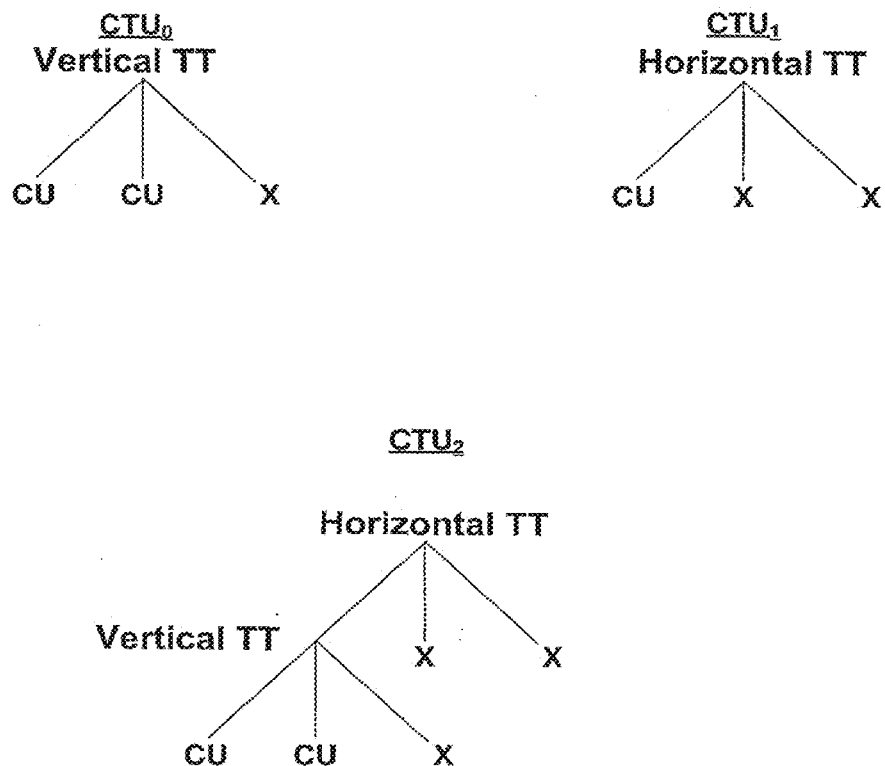
FIG. 16B is a conceptual diagram illustrating an example of partitioning for coding units occurring at picture boundaries in accordance with one or more techniques of this disclosure.
Figure 16C:
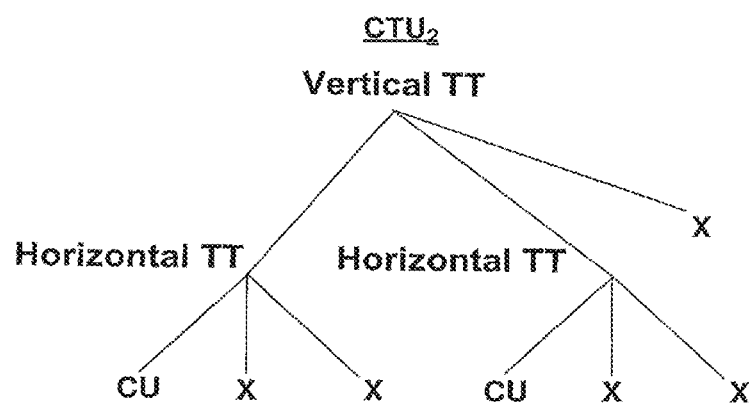
FIG. 16C is a conceptual diagram illustrating an example of partitioning for coding units occurring at picture boundaries in accordance with one or more techniques of this disclosure.

In one example, according to the techniques described herein video encoder 200 may be configured to apply a predefined partitioning to a fractional boundary video block, where the predefined partitioning uses a combination of vertical and horizontal TT split modes to generate CUs within the picture boundaries. That is, in one example, fractional boundary video block are partitioned using only asymmetric vertical and horizontal TT split modes regardless of the partitioning modes available for partitioning video blocks. In one example, the vertical and horizontal TT split modes may include: horizontal TT partitioning at one quarter of the height from the top edge and the bottom edge of a node; and vertical TT partitioning at one quarter of the width from the left edge and the right edge of a node. FIG. 16A is a conceptual diagram illustrating examples of predefined asymmetric vertical and horizontal BT split modes partitions for example fractional boundary video blocks. FIG. 16B is a conceptual diagram illustrating an example of an inferred partitioning tree corresponding to the predefined partition illustrated in FIG. 16A. It should be noted that alternative inferred partitioning trees may be used to generate the resulting predefined partition of $CTU_2$. FIG. 16C illustrates an example of an alternative inferred partitioning tree. It should be noted that in some examples, the CUs illustrated in FIG. 16A within the picture boundary resulting from the inferred partitioning may be further partitioned and in some examples, the CUs illustrated in FIG. 16A within the picture boundary resulting from the inferred partitioning may not be further partitioned. It should be noted that the example predefined partitions illustrated in FIG. 16A result in fewer and larger corresponding CUs within the picture boundary than the example predefined partitions illustrated in FIG. 8.

As described above, in some cases, alternative inferred partitioning trees may correspond to predefined partitions, for example, in the case of $CTU_2$ in the examples above one or more inferred partitioning tress may result in the same predefined partition. In one example, a set of rules may be defined such that one of the inferred partitioning trees is selected. It should be noted that in some cases there may be practical applications for selecting a particular inferred partitioning tree one inferred partitioning trees that result in the same partitioning. For example, in the following cases there may be practical applications for selecting a particular inferred partitioning tree: certain coding tools may only be available for certain partitioning types; the scan-order for coding of the partitioning would be different, so the availability of samples and syntax information of previous/adjacent blocks would be different, thereby effecting coding efficiency. Further, one inferred partitioning tree may be selected as the partitioning tree with better expected coding efficiency.

It should be noted that with respect to the examples described above with respect to FIGS. 14A-16C, each of the examples may be generally described as partitioning fractional boundary video block using a subset of available partition modes. For example, with respect to the example described with respect to FIGS. 14A-14C, in one example, the following partitioning modes may be available: QT, and symmetric vertical and horizontal BT split modes; with respect to the example described with respect to FIGS. 15A-15C, in one example, the following partitioning modes may be available: QT, symmetric vertical and horizontal BT split modes, and four additional asymmetric BT split modes; and with respect to the example described with respect to FIGS. 16A-16C, in one example, the following partitioning modes may be available: QT, symmetric vertical and horizontal BT split modes, and vertical and horizontal TT split modes. Thus, in one example, according to the techniques described herein, fractional boundary video block may be partitioned using a subset of available partition modes and/or partition modes only available for partitioning fractional boundary video blocks (e.g., video blocks that are not fractional boundary video blocks may be partitioned using QTBT partitioning and fractional boundary video blocks may be partitioned using TT partitioning).

In one example, the subset of available partition modes and/or partition modes only available for partitioning fractional boundary video blocks may be based on one or more of the following: the distance of left-top sample (e.g., distance in terms of a number luma samples) of a fractional boundary CTU from the right picture boundary; the distance of left-top sample of a fractional boundary CTU from the bottom picture boundary; the resulting partitioning tree (and/or types of partitions used in) of a spatially adjacent CTU; the resulting partitioning tree (and/or types of partitions used in) of a temporally adjacent CTU, where a temporal adjacent CTU is co-located or offset by a motion vector; and allowed partitioning types for CTUs within a picture.

As described above, in some examples, CUs within the picture boundary resulting from the inferred partitioning may be further partitioned. In one example, according to the techniques described herein, CUs within the picture boundary resulting from the inferred partitioning may be further partitioned using a subset of available partition modes and/or partition modes only available for partitioning CUs within the picture boundary resulting from the inferred partitioning. In one example, the subset of available partition modes and/or partition modes only available for partitioning CUs within the picture boundary resulting from the inferred partitioning may be based on one or more of the following: the distance of left-top sample of a CU from the right picture boundary; the distance of left-top sample of a CU from the bottom picture boundary; the distance of left-top sample of a CU from the right CTU boundary; the distance of left-top sample of a CU from the bottom CTU boundary; the resulting partitioning tree (and/or types of partitions used in) of a spatially adjacent CU; the resulting partitioning tree (and/or types of partitions used in) of a temporally adjacent CU, where a temporal adjacent CU is co-located or offset by a motion vector; and allowed partitioning types for CUs within a picture. Further, in one example the subset of available partition modes and/or partition modes only available for partitioning CUs spanning a picture boundary may be based on one or more of the following: the distance of left-top sample of a CU from the right picture boundary; the distance of left-top sample of a CU from the bottom picture boundary; the distance of left-top sample of a CU from the right CTU boundary; the distance of left-top sample of a CU from the bottom CTU boundary; the resulting partitioning tree (and/or types of partitions used in) of a spatially adjacent CU; the resulting partitioning tree (and/or types of partitions used in) of a temporally adjacent CU, where a temporal adjacent CU is co-located or offset by a motion vector; and allowed partitioning types for CUs within a picture. In one example, an inferred partitioning may be used when a block size exceeds a maximum TU size. Further, in one example, an inferred partitioning may be used when tile and/or slice boundaries are not aligned with CTU boundaries.

In one example, an inferred partitioning may include determining to perform a QT partitioning in cases where all split edges resulting from the QT split lie outside of a picture boundary (e.g., a CTU extends beyond the bottom-right picture boundary). In one example, a QT split may be inferred if all its split edges resulting from the QT split lie outside the picture boundary and the split edges are closest to the picture boundary compared to another split, where closeness to a picture boundary may be quantified according to the one or more of the following: smallest vertical and horizontal distance, smallest vertical distance, smallest horizontal distance, and/or smallest average of horizontal and vertical distance. In one example, an inferred partitioning which includes determining to perform a QT partitioning may further included determining a number of recursive QT splits to perform. The number of recursive QT splits to perform may be based on one or more of the following parameters described above (e.g., the distance of left-top sample of a fractional boundary CTU from the right picture boundary, slice type, etc.). It should be noted that in some examples, recursive QT splits may be conditionally applied to parent nodes. For example, if the minimum number of QT splits is equal to 2. A second level QT split may be conditionally applied to each four nodes resulting from the first level split. For example, in one example, minimum inferred QT splits may be applicable only to nodes of that cross a picture boundary edge. In one example, if nodes resulting from a minimum inferred QT split cross picture boundary edge, another split type may be inferred from the node (e.g., BT horizontal) according to any combination of the techniques described herein. For example, a needed number of BT partitions may be determined for a node resulting from a minimum inferred QT split cross picture boundary edge according to the techniques described below. Further, in one example, partitions that do not cause a split for block of samples inside picture boundary may be applied according to the following:

```
if (bVerSplitAllowed && VertPartition != INFER_NONE &&
HorzPartition !=
INFER_NONE && bVertPartitionInsidePicture==true)
  {
    bVerSplitAllowed = false;
  }
if (bHorSplitAllowed && VertPartition != INFER_NONE &&
HorzPartition !=
INFER_NONE && bHorzPartitionInsidePicture==true)
  {
    bHorSplitAllowed = false;
  }
// != INFER_NONE implies that it is a valid option
```

Where, bVerSplitAllowed indicates whether a binary vertical split is allowed;

bHorSplitAllowed indicates whether a binary horizontal split is allowed;

VertPartition !=INFER_NONE indicates a vertical partition is not a valid option;

HorzPartition !=INFER_NONE indicates a horizontal partition is not a valid option;

bHorzPartitionInsidePicture indicates whether a binary horizontal split would cause a split for a block of samples inside a picture boundary;

bVemPartitionInsidePicture indicates whether binary vertical split for a block of samples inside a picture boundary.

In one example, at each implicit partitioning step, binary tree splits in horizontal and vertical direction are chosen independently. For each direction the binary tree split that results in the split edge being closest to the picture boundary may be selected. Between the two candidates (one for each direction) the one that does not partition the block of samples inside the picture boundary is chosen, otherwise the horizontal partition is chosen.

In one example, lower resolution pictures may use a larger minimum number of inferred QT splits compared to higher resolution pictures. In one example, slices having an I-type (i.e., an I-slice) may use a larger minimum number of inferred QT splits compared to slices having a non I-type. In one example, a luma channel of an I-slice may use a larger minimum number of inferred QT splits compared to a chroma channel of an I-slice. In one example, larger CTU sizes may use a larger number of a minimum number of inferred QT splits compared to smaller CTU sizes. In one example, for CTUs spanning across picture boundary, when number of samples inside the picture boundary is relatively greater, then the minimum number of inferred QT splits is may be larger. In one example, when a QP value is relatively smaller, then the minimum number of inferred QT splits is larger. In one example, the minimum number of inferred QT splits may be larger, if adjacent blocks have a larger number of QT splits.

As described above, in some cases, a CTU size may be 128×128 and a picture resolution may be 1920×1080. In such a case, the bottom row of CTUs would include fractional boundary CTUs having 56 rows of samples with picture boundary. In similar manner, for a CTU size of 128×128 and a picture resolution 3840×2160, the bottom row of CTUs would include fractional boundary CTUs having 112 rows of samples with picture boundary. Each of these cases, may occur relatively frequently and as such in some cases, according to the techniques describe herein, default partitioning may be defined for the bottom row CTUs. It should be noted that in these cases, there may be several ways to partition a CTU such that one or more CUs are parallel to and included within the picture boundary. In one example, according to the techniques herein, the resulting inferred partitions for these case are limited to power of two block sizes. In one case, the power of two block sizes are monotonically decreasing for blocks closer to the picture edge. In an example, the coding order of blocks would be to code blocks further from the edge first.

In one example, for the case where a CTU size is 128×128 and a picture resolution is 1920×1080, the bottom row CTUs may be partitioned such that the 56 rows of samples included within the picture boundary are partitioned into a 128×48 upper CU and a 128×8 lower CU. In one example, the partitioning may be generated from a inferred tree illustrated in FIG. 17A.

In one example, for the case where a CTU size is 128×128 and a picture resolution is 1920×1080, the bottom row CTUs may be partitioned such that the 56 rows of samples included within the picture boundary are partitioned into a 128×32 upper CU, a 128×16 middle CU and a 128×8 lower CU. In one example, the partitioning may be generated from a inferred tree illustrated in FIG. 17B. In one example, for the case where a CTU size is 128×128 and a picture resolution is 1920×1080, the bottom row CTUs may be partitioned such that the 56 rows of samples included within the picture boundary are partitioned into a 128×32 upper CU, a 128×8 middle CU and a 128×16 lower CU. In one example, the partitioning may be generated from a inferred tree illustrated in FIG. 17C. In one example, for the case where a CTU size is 128×128 and a picture resolution is 1920×1080, the bottom row CTUs may be partitioned such that the 56 rows of samples included within the picture boundary are partitioned into an upper 128×16 CU, a middle 128×32 CU, and a lower 128×8 CU. In one example, the partitioning may be generated from a inferred tree illustrated in FIG. 17D. It should be noted that in one example, each of the examples illustrated in FIGS. 17B, 17C, and 17D may be applied in the cases where asymmetric BT partitioning is not allowed.

Figure 18A:
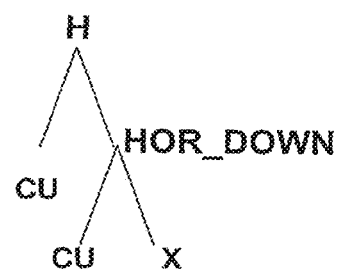
FIG. 18A is a conceptual diagram illustrating an example of partitioning for coding units occurring at picture boundaries in accordance with one or more techniques of this disclosure.

In one example, for the case where a CTU size is 128×128 and a picture resolution is 3840×2160, the bottom row CTUs may be partitioned such that the 112 rows of samples included within the picture boundary are partitioned into a 128×64 upper CU and a 128×48 lower CU. In one example, the partitioning may be generated from a inferred tree illustrated in FIG. 18A. In one example, for the case where a CTU size is 128×128 and a picture resolution is 3840×2160, the bottom row CTUs may be partitioned such that the 112 rows of samples included within the picture boundary are partitoned into a 128×96 upper CU and a 128×16 lower CU. In one example, the partitioning may be generated from a inferred tree illustrated in FIG. 18B.

In one example, for the case where a CTU size is 128×128 and a picture resolution is 3840×2160, the bottom row CTUs may be partitioned such that the 112 rows of samples included within the picture boundary are partitioned into a 128×32 upper CU, a 128×64 middle CU, and a 128×16 lower CU. In one example, the partitioning may be generated from a inferred tree illustrated in FIG. 18C. In one example, for the case where a CTU size is 128×128 and a picture resolution is 3840×2160, the bottom row CTUs may be partitioned such that the 112 rows of samples included within the picture boundary are partitioned into a 128×64 upper CU, a 128×32 middle CU, and a 128×16 lower CU. In one example, the partitioning may be generated from a inferred tree illustrated in FIG. 18D. It should be noted that in one example, each of the examples illustrated in FIGS. 18C and 18D may be applied in the cases where asymmetric BT partitioning is not allowed.

It should be noted that in some cases, a tile or slice may include only fractional boundary CTU's. In such cases, the techniques described above, may be used for partition the fractional boundary CTU's included in the slice or tile.

Figure 20:
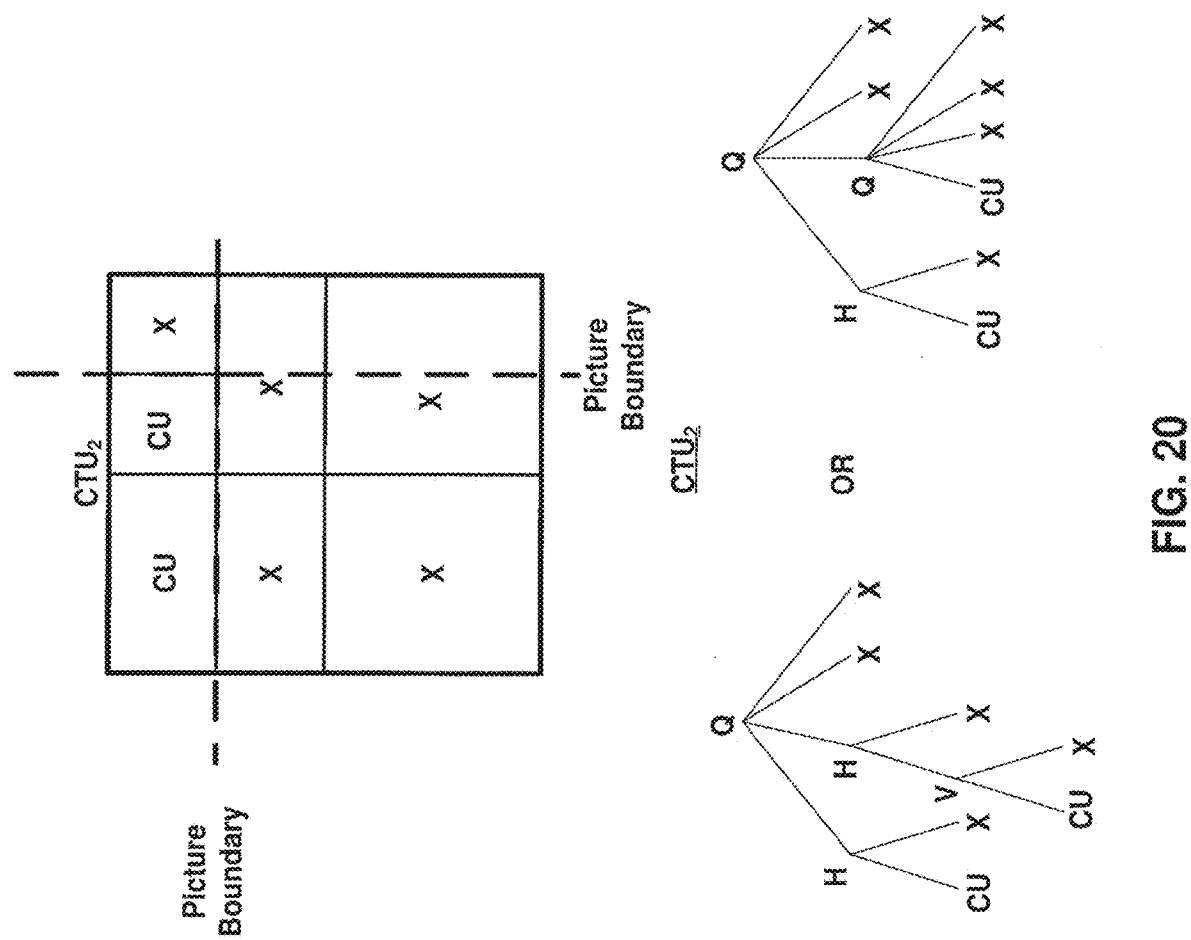
FIG. 20 includes conceptual diagrams illustrating examples of partitioning for coding units occurring at picture boundaries in accordance with one or more techniques of this disclosure.

As described above, JEM includes the parameters MinQTSize, MaxBTSize, MaxBTDepth, and MinBTSize for use in signaling of a QTBT tree. It should be noted that with respect MinQTSize and MaxBTSize there may be various ways in which a size may be specified. In one example, size may be specified according to a threshold dimension value and, in the case of MaxBTSize, if either the height or the width exceeds the dimension value the block is not allowed to be split according to a BT split mode. In some cases, a predefined partitioning for a fractional boundary video block may be inconsistent with values of MinQTSize, MaxBTSize, MaxBTDepth, and MinBTSize. For example, referring to block $CTU_2$, in the example illustrated in FIG. 14A, as illustrated in FIG. 14B, a vertical BT split occurring at BT depth 3 is used to generate the right-most CU included within the picture boundary. In this case, when fractional boundary video block are partitioned using only symmetric vertical and horizontal BT split modes, the partitioning of $CTU_2$ illustrated in FIG. 14A, would be inconsistent with MaxBTDepth being less than 3. Further, in the case where the CTU is 128×128, in order for the partitioning of $CTU_2$ illustrated in FIG. 14A, to be consistent with MaxBTSize would be required to be greater than or equal to 128 (e.g., when MaxBTSize is expressed as a dimension threshold value). In one example, in order to ensure compliance with values of MinQTSize, MaxBTSize, MaxBTDepth, and/or MinBTSize, video encoder 200 may be configured to apply exceptions to a predefined partitioning for fractional boundary video blocks. For instance, in one example, video encoder 200 may be configured to enable additional available partition modes other than the types used according to a predefined partitioning. For example, with respect to the example of $CTU_2$ illustrated in FIG. 14A, video encoder 200 may be configured to enable QT partitioning when MaxBTDepth is set to a value less than 3. FIG. 20 illustrates an example where QT partitioning is enabled for partitioning $CTU_2$. In one example, the QT partitioning may be enabled for partitioning $CTU_2$, until constraints corresponding to set values of MaxBTSize, MaxBTDepth, and/or MinBTSize can be satisfied. In one example, the QT partitioning may be enabled for partitioning $CTU_2$ without restriction. In a similar manner, asymmetric BT partitioning may be used for partitioning fractional boundary video blocks, even if the use of asymmetric BT partitioning is not allowed for other CTU's. It should be noted that in some cases, the use of asymmetric BT partitioning for partitioning fractional boundary video blocks may be restricted until constraints corresponding to set values of MaxBTSize, MaxBTDepth, and/or MinBTSize can be satisfied. It should be noted that in some examples, an exception may include enabling partitioning types for fractional video blocks that are disabled based on a video layer property (e.g., allow an exception to disabling asymmetric BT partitionings for higher temporal layers). Further, in some examples, splits may be inferred based on temporal layer values. For example, one or more aspects of a QT inference may be disabled for higher temporal layers. Further, in some cases, explicit signaling may be used to indicate whether QT inference is disabled for a temporal layer (e.g., a flag may be signaled for each respective layer). In some cases, one or more inference rules may be defined to determine whether QT inference is disabled for a temporal layer. For example, a temporal layer threshold value at which QT inference is disabled may be determined based on coding parameters and/or video properties. Further, in some examples a temporal layer threshold value may be signaled. Further, in some examples MaxBTDepth may be incremented or decremented based on a temporal layer value. In a similar manner, a QP value may be determined for a slice or a picture and splits may be inferred based on the determined QP value.

Further, in some examples, values of MinQTSize, MaxBTSize, MaxBTDepth, and/or MinBTSize may be set differently, not applied, or changed for fractional boundary video blocks (i.e., set values may be overridden). For example, one or more of the following may be applied for fractional boundary video blocks: increase the value of MaxBTSize for fractional boundary video blocks; and/or increase the value of MaxBTDepth for fractional boundary video blocks. In one example, MaxBTSize may be set for fractional boundary video blocks based on one or more of: a slice type; a value of MaxBTSize for non-fractional boundary video blocks; and/or a maximum, an average, a median, and/or a minimum size of BT nodes resulting from the partitioning of a subset of CTUs in one or more previously coded pictures. For example, for a non-boundary CTU in a previously coded picture, the size of the smallest resulting BT node may be 32×64. Based on this value, the MaxBTSize may be set for fractional boundary video blocks as, for example, 128. In one example, when MaxBTSize is set as threshold dimension which is applied to both a height and width dimension, MaxBTSize, may be set such that its value is greater than or equal to the maximum of the smallest resulting BT node (e.g., MaxBTSize>=max(height, width), where max(x,y) returns x, if x is greater than or equal to y, otherwise returns y). In one example, when MaxBTSize is set as threshold dimension that is set respectively for each of height and width dimension (e.g., MaxBTSizeH for height and MaxBTSizeW for width), MaxBTSize may be set such that each respective value is greater than or equal to the corresponding value of the smallest resulting BT node (e.g., MaxBTSizeH >=height and MaxBTSizeW>=width). In some examples, values of MinQTSize, MaxBTSize, MaxBTDepth, and/or MinBTSize may be set differently, not applied, or changed for fractional boundary video blocks by signaling values in a bitstream, for example, in parameter sets, slice headers, video block signaling etc.

Further, in some examples, for inter slices MaxBTSize may be set to a predetermined value (e.g., CTU size) for fractional boundary video blocks. In one example, MaxBTDepth may be set for fractional boundary video blocks based on one or more of: a slice type; and/or the boundary edge type (i.e., right, bottom, or bottom-right) that the fractional boundary video block intersects. In one example, MaxBTDepth may be increased based on a predefined value, and/or a value that enables a desired partitioning. Further, in some examples, MaxBTDepth may be further increased according to a safety margin value. In one example, MaxBTDepth may be increased based on a depth at which a final BT split occurs to generate a particular partition, where the final BT split is a BT split at the lowest level in a BT split hierarchy for the particular partition. For example, referring to block $CTU_2$, in the example illustrated in FIG. 14A, the depth at which the final BT split occurs to generate the right-most CU included within the picture boundary, i.e., 3 may be added to a current value of MaxBTDepth to increase the MaxBT-Depth for a fractional boundary video block. Examples of techniques for determining a depth required to generate a particular partition are described in further detail below. It should be noted that a current value of MaxBTDepth may be derived from spatial-temporal adjacent blocks (e.g., CUs, CTUs, PUs, TUs, etc.) and/or from higher level signaling (e.g. parameter sets and/or a slice header). Further, in some examples, MaxBTDepth may be increased based on the number of BT splits needed (or used) to generate a particular partition (i.e., a BT split count value). For example, referring to block $CTU_2$, in the example illustrated in FIGS. 14A and 14B, the BT split count value required be to generate the right-most CU included within the picture boundary is 4. This value may be added to a current value of MaxBTDepth to increase the MaxBTDepth for a fractional boundary video block. In one example, a BT split count value may correspond to the largest number of BT splits that need to be traversed from the root (i.e., CTU-level) in a partition tree to reach a CU in a particular partitioning.

Figure 17A:
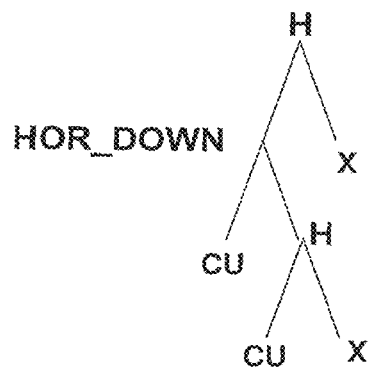
FIG. 17A is a conceptual diagram illustrating an example of partitioning for coding units occurring at picture boundaries in accordance with one or more techniques of this disclosure.
Figure 17B:
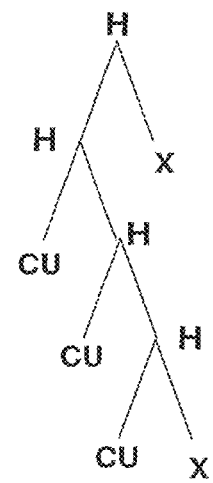
FIG. 17B is a conceptual diagram illustrating an example of partitioning for coding units occurring at picture boundaries in accordance with one or more techniques of this disclosure.
Figure 17C:
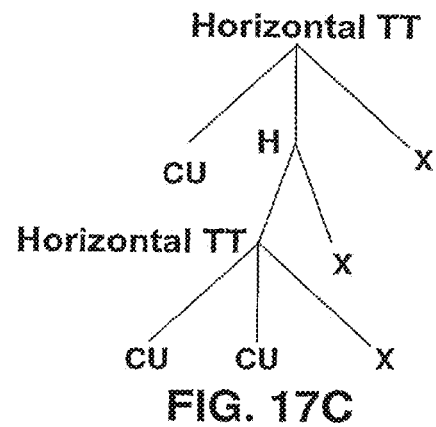
FIG. 17C is a conceptual diagram illustrating an example of partitioning for coding units occurring at picture boundaries in accordance with one or more techniques of this disclosure.
Figure 17D:
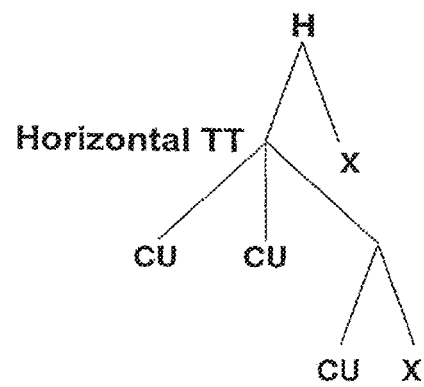
FIG. 17D is a conceptual diagram illustrating an example of partitioning for coding units occurring at picture boundaries in accordance with one or more techniques of this disclosure.
Figure 18B:
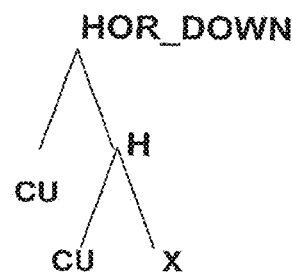
FIG. 18B is a conceptual diagram illustrating an example of partitioning for coding units occurring at picture boundaries in accordance with one or more techniques of this disclosure.
Figure 18C:
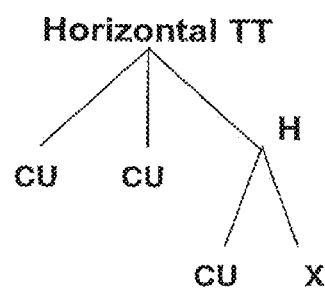
FIG. 18C is a conceptual diagram illustrating an example of partitioning for coding units occurring at picture boundaries in accordance with one or more techniques of this disclosure.
Figure 18D:
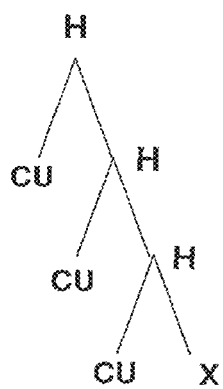
FIG. 18D is a conceptual diagram illustrating an example of partitioning for coding units occurring at picture boundaries in accordance with one or more techniques of this disclosure.

As described above, with respect to FIG. 17A, for the case where a CTU size is 128×128 and a picture resolution is 1920×1080, the bottom row CTUs may be partitioned such that the bottom row CTUs may be partitioned such that the 56 rows of samples included within the picture boundary are partitioned into a 128×48 upper CU and a 128×8 lower CU. As illustrated in FIG. 17A, the BT split count value to generate the 128×8 lower CU included within the picture boundary is 3 and the depth at which the final BT split occurs is 2. As described above, with respect to FIG. 18B, for the case where a CTU size is 128×128 and a picture resolution is 3840×2160, the bottom row CTUs may be partitioned such that the 112 rows of samples included within the picture boundary are partitioned into a 128×96 upper CU and a 128×16 lower CU included within the picture boundary. As illustrated in FIG. 18B, the BT split count value to generate the 128×16 lower CU included within the picture boundary is 3 and the depth at which the final BT split occurs is 2. In one example, in these cases, a new value for MaxBTDepth may be determined for fractional boundary video blocks by using one or more of the following techniques: adding a predefined value to MaxBTDepth, adding a predefined value to MaxBTDepth and a safety margin value to MaxBTDepth, and/or setting MaxBTDepth, wherein the technique used and/or a predefined value is determined based on the CTU size and/or picture size. More generally, a particular combination of CTU size and picture size may be associated with a particular predefined partitioning for fractional boundary video blocks, where the predefined partitioning is associated with a BT split count value and a depth value at which the final BT split occurs. The BT split count value and/or the depth value at which the final BT split occurs for the predefined partitioning may be used to modify MaxBTDepth.

Figure 21:
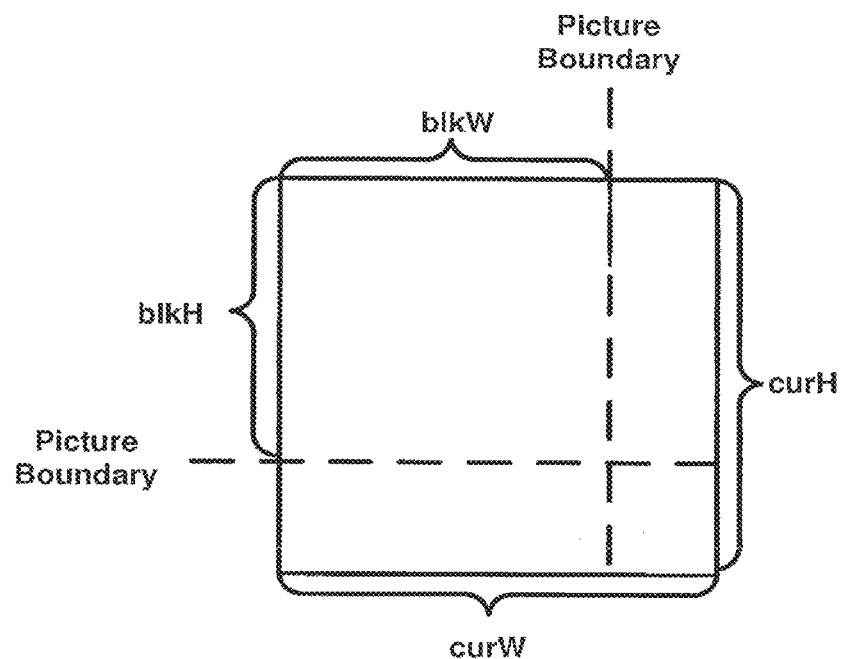
FIG. 21 includes a conceptual diagram illustrating examples of partitioning for coding units occurring at picture boundaries in accordance with one or more techniques of this disclosure.

As described above, having a relatively large number of relatively small video blocks occurring at or near a picture boundary may adversely impact coding efficiency. More generally, how a fractional video block is partitioned impacts coding efficiency. For example, referring to FIG. 21, there may be several ways to partition a fractional video block having a height, curH, and a width, curW, such that height, blkH, and width, blkW, are included within the picture boundary. It should be noted that in this general case, curH and curW may be less than or equal to a CTU size. That is, the fractional video block may be a CTU or a smaller video block. Further, as described above, MaxBTDepth may be increased for fractional video blocks. When MaxBT-Depth is increased, a larger set of possible partitionings become available for partitioning a CTU. Increasing the set of possible partitionings available for partitioning a CTU can, in some cases, slow down a video encoder (i.e., decrease video encoder performance). For example, a video encoder implementation that evaluates all (or a significant portion) of the possible partitionings when selecting a particular partitioning for a CTU may see a decrease in performance as MaxBTDepth is increased, as there are more possible partitionings to evaluate. According to the techniques described herein, video encoder 200 may be configured to partition a fractional video block based on curH, curW, blkH, and blkW and the available BT split modes in a manner that increases coding efficiency. Further, video encoder 200 may be configured to increase MaxBTDepth for fractional video blocks in a manner that mitigates a potential decreases in video encoder performance.

In one example, video encoder 200 may be configured to determine a value indicating a needed number of BT partitions, or splits, (e.g., a BT split count value, N_BT_Part) in order for the portion of the fractional video block corresponding to blkH and blkW to be included within the picture boundary. In some examples, the needed number of BT partitions may be used to partition a video block and/or increase MaxBTDepth. It should be noted that while a needed number of partitions is inherently based on curH, curW, blkH, and blkW and the available BT split modes, the needed number of partitions may also be based on a slice type. Further, it should be noted that there may be various processes for determining the needed number of partitions based on curH, curW, blkH, and blkW and the available BT split modes, where some processes are more efficient than others. According to the techniques described herein, video encoder 200 and video decoder 300 may be configured to determine a needed number of partitions based on the algorithm described below. It should be noted that with respect to the algorithm described below, the available BT split modes for a fractional video block include symmetric vertical and horizontal BT split modes, and the four additional asymmetric BT split modes described above.

Figure 22:
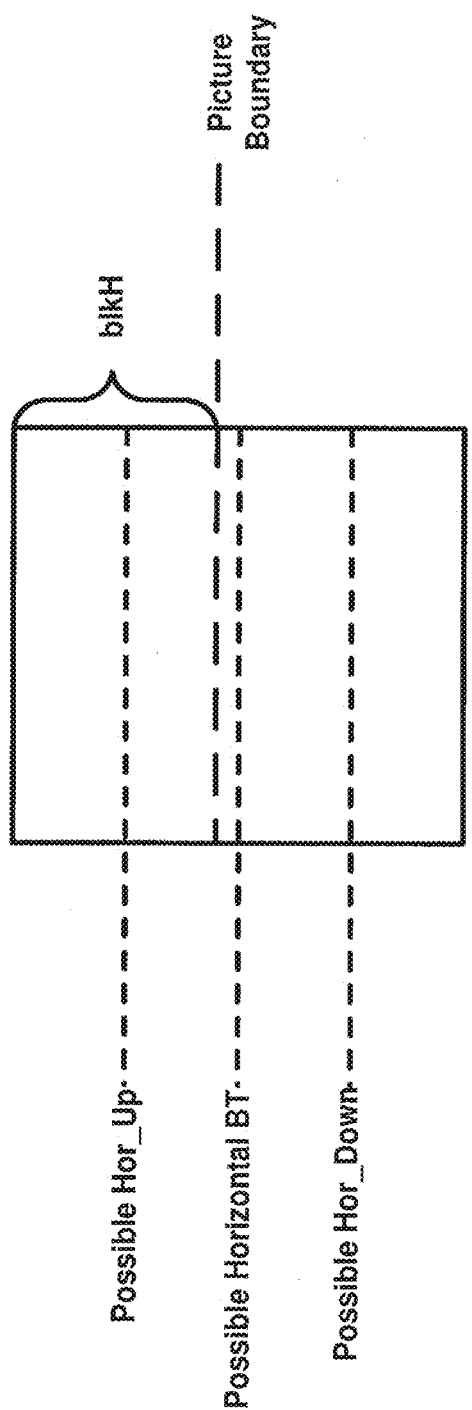
FIG. 22 includes a conceptual diagram illustrating examples of partitioning for coding units occurring at picture boundaries in accordance with one or more techniques of this disclosure.

Video encoder 200 and video decoder 300 may be configured to determine a needed number of partitions based on the following algorithm:
  Determine values mults3CountH and mults3CountW, where mults3CountH indicates N of $3^N$ in the prime factorization of blkH and mults3CountW indicates N of $3^N$ in the prime factorization of blkW;
  Set variable neededBTPartitions to 0;
  Until a horizontal partition is aligned with picture boundary:
    Select a horizontal BT split mode according to a set of partitioning rules, where Hor_Down may only be selected if mults3CountH>0.
      For each selection of Hor_Down, reduce mults3CountH by 1;
      For each selected horizontal BT split mode, increment neededBTPartitions by 1;
      For each selected Horizontal BT split mode, update cures, blkH, and mults3CountH for the current video block that spans across (or touches) the horizontal picture boundary;

Until a vertical partition is aligned with picture boundary:
  Select a vertical BT split mode according to a set of partitioning rules, where Ver_Right may only be selected if mults3CountV>0.
    For each selection of Ver_Right, reduce mults3CountV by 1;
    For each selected vertical BT split mode, increment neededBTPartitions by 1;
    For each selected Vertical BT split mode, update curW, blkW, and mults3CountW for the current video block that spans across (or touches) the vertical picture boundary;
  Output neededBTPartitions It should be noted that in the example algorithm above, the order in which the horizontal partitioning and the vertical partitioning are performed may be interchanged. Further, individual horizontal partitioning and vertical partitioning steps may be performed according to a defined order. For example, horizontal partitioning and the vertical partitioning may be performed by alternating the performance of horizontal and vertical partitionings. In one example, horizontal partitioning and the vertical partitioning may be performed by alternating the performance of a set number of horizontal and vertical partitionings (e.g., perform two horizonal, then two vertical, then two horizontal, etc.). In one example, selection preference may be given to one of horizontal or vertical BT partition modes. For example, horizontal BT partition modes may be executed until one of the partitioning edges aligns with the horizontal picture boundary, before performing any vertical BT partition modes. As provided in the example algorithm above, BT split modes are selected according to a set of partitioning rules. That is, a set of partitioning rules includes rules for selecting one of: a symmetric BT mode, a one-quarter asymmetric BT split mode (i.e., Hor_Up and Ver_Left), or a three-quarter asymmetric BT split mode (i.e., Hor_Down and Ver_Right). In one example, a predefined rule may include selecting one of a symmetric BT mode, a one-quarter asymmetric BT split mode, or a three-quarter asymmetric BT split mode that provides the greatest reduction of curH (or curV) and/or blkH (or blkW) when updated. For example, if curH is equal to 128 and blkH is equal to 112, after a symmetric BT split, curH would be equal to 64 and blkH would be equal to 48, after a Hor_Up split, curH would be equal to 96 and blkH would be equal to 80, and after a Hor_Down split, curH would be equal to 32 and blkH would be equal to 16. In this case, the Hor_Down split provides the greatest reduction in curH and blkH. However, in this case, mults3CountH is not greater than 0. Thus, in this case, in one example, a symmetric BT split may be selected as it provides a greater reduction in curH and blkH than Hor_Up. In one example, a predefined rule may include selecting one of a symmetric BT mode, a one-quarter asymmetric BT split mode, or a three-quarter asymmetric BT split mode based which partition mode results in partition boundary which is the closest to a picture boundary. For example, FIG. 22 illustrates an example of respective possible horizontal boundaries resulting from each of a symmetric BT mode, a one-quarter asymmetric BT split mode, or a three-quarter asymmetric BT split mode in relation to a horizontal picture boundary. As illustrated in FIG. 22, the boundary resulting from the symmetric BT mode is the closest to a picture boundary. The closeness of a boundary to the picture boundary may be quantified according to an absolute distance value. For example, in the example illustrated in FIG. 22, in the case where curH is 128 and blkH is 56, for the symmetric BT mode, the resulting partition corresponds to curH equal to 64, blkH equal to 56, and a distance between the partition boundary and the picture boundary of 8; for the one-quarter asymmetric BT split mode, the resulting partition corresponds to a curH equal to 32, blkH equal to 24, and a distance between the partition boundary and the picture boundary of 24; and for the three-quarter asymmetric BT split mode, the resulting partition corresponds to curH equal to 96, blkH equal to 54, and a distance between the partition boundary and the picture boundary of 40.

It should be noted in cases where a selection is based on the greatest reduction of one of currH (or currV), blkH (or blkW), and/or a distance value, and two partition modes provide the same reduction and/or distance value, the partition mode that provides the least number of partitionings inside the picture is selected and/or a default order of partitioning modes may be used as a tie-breaker. In one example, selection preference may be given to symmetric BT partition modes. For example, horizontal symmetric BT partitions may be executed until one of the partitioning edges aligns with the horizontal picture boundary. In general, selection preference may be given to a BT partitioning that introduces the fewest number of partitioning inside the picture.

Figure 23:
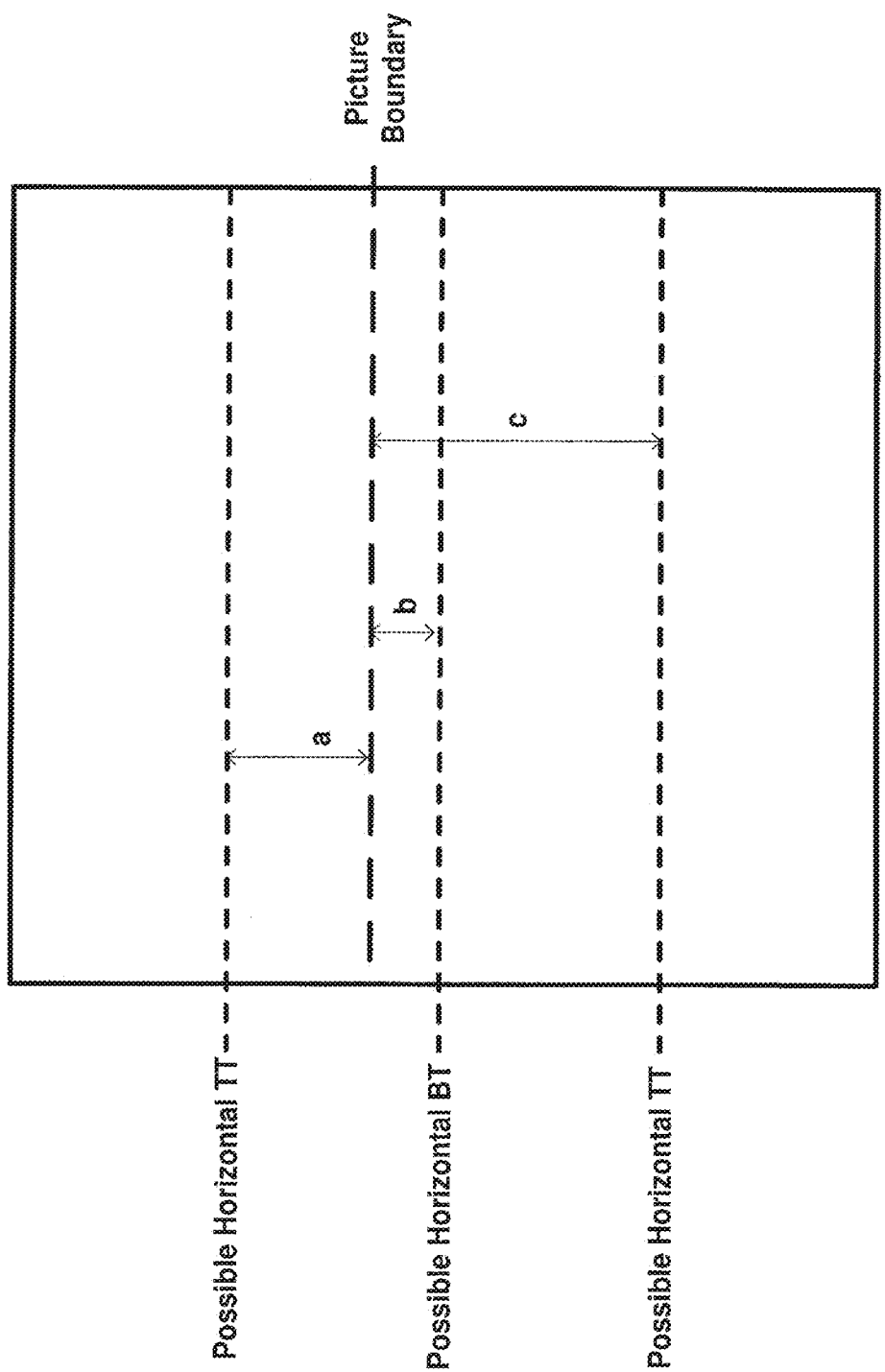
FIG. 23 includes a conceptual diagram illustrating examples of partitioning for coding units occurring at picture boundaries in accordance with one or more techniques of this disclosure.
Figure 24:
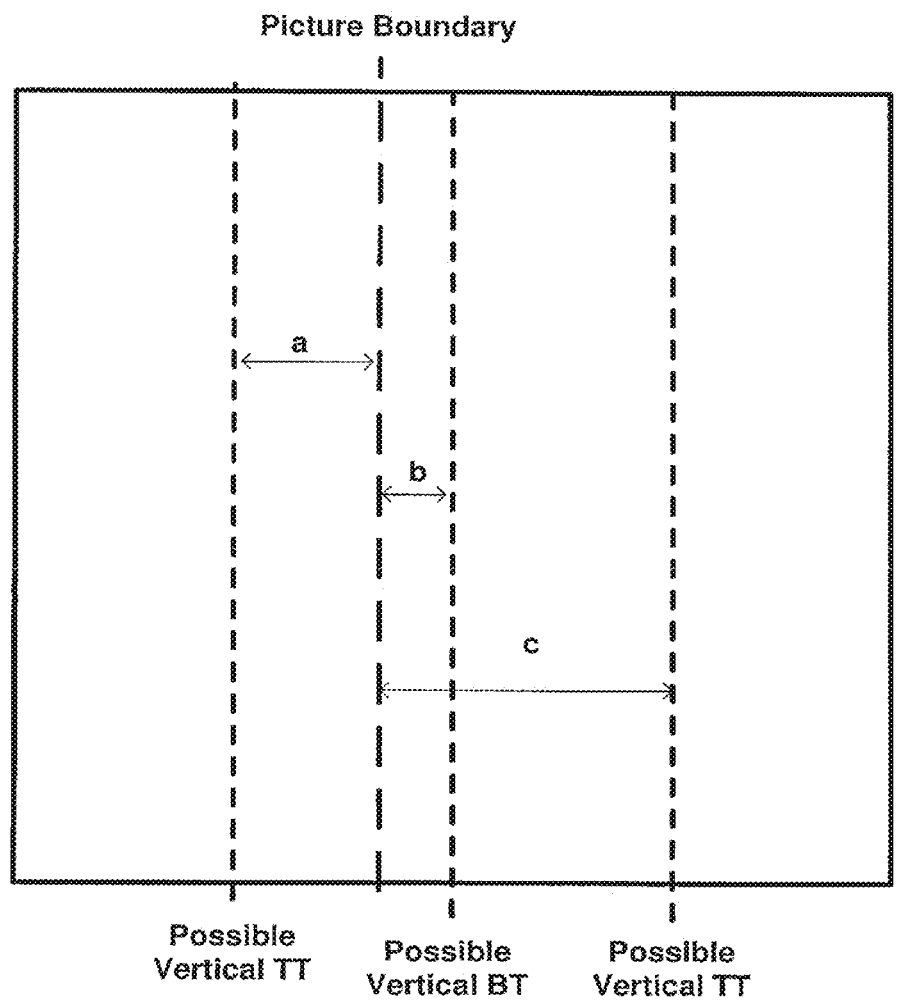
FIG. 24 includes a conceptual diagram illustrating examples of partitioning for coding units occurring at picture boundaries in accordance with one or more techniques of this disclosure.

In one example, a predefined rule may include selecting one of a symmetric BT mode or a TT split mode based on which partition mode results in partition boundary which is the closest to a picture boundary. For example, FIG. 23 illustrates an example of respective possible horizontal boundaries resulting from each of a symmetric BT mode or TT split mode and FIG. 24 illustrates an example of respective possible vertical boundaries resulting from each of a symmetric BT mode or TT split mode. As illustrated in FIG. 23 and FIG. 24, distances a, b, and c represent the distance between a boundary resulting from a split and the picture boundary. With respect to FIG. 23, closeness may be determined as follows: if(min(abs(a), abs(c))<abs(b)), then select TT horizontal partition; otherwise, select BT horizontal partition. Similarly, with respect to FIG. 24, closeness may be determined as follows if(min(abs(a), abs(c))<abs(b)), then select TT vertical partition; otherwise, select BT vertical partition. It should be noted that in one example, in cases where a fractional video block intersects a vertical and a horizontal picture boundary, in one example, horizontal partitioning that includes selection of a symmetric BT mode or a TT split mode as described above may be performed, then vertical partitioning that includes selection of a symmetric BT mode or a TT split mode may be performed.

In some cases, a partition type is selected for a fractional video block only if at least one of the split partitionings aligns with a picture boundary (i.e., the resulting distance is 0). For example, a TT split mode is only selected if at least one of the split partitionings aligns with a picture boundary.

As described above, there may be common cases generating fractional video blocks based on combination of a CTU size and a picture size (e.g., a CTU size is 128×128 and a picture size is 1920×1080 or a CTU size is 128×128 and a picture size is 3840×2160). In some examples, a set of partitioning rules may be defined for a CTU size and a picture size combination. That is, in general, a particular combination of CTU size and picture size may be associated with a particular predefined partitioning for fractional boundary CTUs. For example, for the case where a CTU size is 128×128 and a picture size is 1920×1080 or 3840×2160, a set of partitioning rules may include the following:

```
    if ((curH==128 && blkH==112) || (curH==64 &&
blkH==56))
        {
            selectedMode = infer HOR_Down;
        }
    else if (curH==128 && blkH==56)
        {
            selectedMode = infer Horizontal BT;
        }
and
    if ((curW==128 && blkW==112) || (curW==64 &&
blkW==56))
        {
            selectedMode = infer VER_Right;
        }
    else if (curW==128 && blkW==56)
        {
            selectedMode = infer Vertical BT;
        }
``` where,
== is the equal to relational operator;
x&&y is the Boolean logical "and" of x and y;
x||y is the Boolean logical "or" of x and y.

It should be noted that, in some examples, the example partitioning rules above may be applied independent of picture size. Further, it should be noted that a set of partitioning rules may include a combination of rules, where, for example, the combination of rules are based on video and/or coding properties.

It should be noted that in the example algorithm above, a three-quarter asymmetric BT split mode are not allowed to be selected unless respective values of mults3CountH and mults3CountV are greater than 0. If this constraint was not in place, there may be cases where a three-quarter asymmetric BT split results in a block dimension not being a power of 2. For example, if a 32×32 block is split using Vert_Right, the resulting blocks are 24×32 and 8×32 (24 is not a power of 2). Having a block that is not a power of 2 may influence subsequent steps in creating a partitioning and may lead to a partitioning with an excessive number of partitionings. Therefore, in some cases, a three-quarter asymmetric BT split mode is only allowed to be selected, if a multiple of 3 exists in the prime factorization of block size/dimension being considered. Further, it should be noted that in some examples, luma and chroma channels of a fractional video block may share a partitioning (e.g., a partitioning provided according to the algorithm above). In some examples, luma and chroma channels of a fractional video block may use different partitionings (e.g., for I-slices, the algorithm above may be applied independently to each channel).

As described above, when MaxBTDepth is increased, the corresponding increase in the set of possible partitionings may decrease video encoder performance. In one example, in order to mitigate a decrease in video encoder performance, a height threshold may be determined as the smallest height block inside a picture when only QT partitioning is used to create a partitioning tree and a width threshold may be determined as the smallest height block inside picture when only QT partitioning is used to create a partitioning. For example, referring to FIG. 8, if $CTU_2$ is 128×128, the height threshold would be 32 and the width threshold would be 32. Based on the height threshold and the width threshold, partitioning of a fractional video block according to a subset of available partitioning modes (e.g., symmetric BT and asymmetric BT) may be performed until a condition based on the height threshold and/or width threshold is satisfied. For example, in one example, during the horizontal partitioning of a video block, if the current height of block exceeds the height threshold, then only horizontal symmetric BT partitioning is allowed. It should be noted that this condition does not limit vertical partitioning types. Further, in one example, during the vertical partitioning of a video block, if the current width of a block exceeds the width threshold, then only vertical symmetric BT partitioning is allowed. It should be noted that this condition does not limit horizontal partitioning types. It should be noted that in some examples, a common threshold value may be defined, (e.g., a maximum dimension of block). Further, it should be noted that the split mode of not splitting the block may be available. It should be noted that limiting partitioning types that may be selected based on a threshold value may be used to modify signaling, such that the signaling only indicates partition types that may be selected (e.g., partition type indexing may be simplified based on a reduced number of partitioning types that may be selected). Such signaling modifications may result in improved coding efficiency. It should be noted that in some examples, instead of height and width thresholds, a threshold may be defined as a number of samples of a video block (e.g., 1,024). Further, it should be noted that thresholds may be further based on other video and video coding properties. For example, the threshold may be increased or decreased from a determined value based on slice type. Further, in one example, different thresholds may be set for different regions of a CTU. For example, a upper portion of a CTU may have an increased threshold.

It should be noted that in some cases, a partition mode may result in a block size that is not supported (e.g., not supported for a subsequent video coding process). In one example, a partitioning type resulting in that block size that is not supported may be disallowed. In one example, an exception may be made for a fractional video block and the partitioning type may be used although it would otherwise result in a block size that is not supported. It should be noted that in this case, in some examples, a subsequent video coding process may be modified to handle such an exception.

As described above, a video encoder may evaluate possible partitionings from set of possible partitionings. In one example, according to the techniques herein, video encoder 200 may be configured to identify all valid partitions of a fractional video block, according to the constraints described above (e.g., allowed partition types, BT depth constraints, etc.), where a valid partitioning may be defined as a partitioning that results in no leaves of the partitioning tree spanning across picture boundary without further partitioning once this condition is satisfied. It should be noted that subsequent further partitioning of a valid partitioning may be allowed. Video encoder 200 may label each valid partition with an index value. It should be noted that indexing may correspond to a defined order in which valid partitionings are generated. For example, the algorithm above may determine valid partitions based on a defined preference order of partition type selection. Video encoder 200 may then select one of the valid partitions (e.g., based on a rate-distortion optimization algorithm). Video encoder 200 may signal the selected partition using the index value. In this manner, a video decoder may perform the same process as video encoder to identify and index the valid partitions and determine the selected partition by parsing an index value from a bitstream. It should be noted that a process of identifying and indexing valid partitions may be shared or performed independently for luma and chroma channels.

As described above with respect to FIG. 10, in some examples, the offsets corresponding to a BT split (Offset$_1$) may be arbitrary instead of occurring at the predefined locations. In one example, according to the techniques herein, video encoder 200 may be configured to use arbitrary offset partitioning for fractional video blocks. For example, non-fractional video blocks may be partitioned according to a base partitioning technique (e.g., QTBT partitioning) with corresponding syntax and semantics and fractional video blocks may be partitioned according to an arbitrary offset partitioning technique with corresponding syntax and semantics. For example, for fractional video blocks offset values such as, 56 and 112 may be signaled as used for partitioning. It should be noted that an arbitrary offset partitioning technique may include signaling a horizontal offset value and a vertical offset value. For example, referring to FIG. 21 respective offset values may be signaled for blkH and blkW. Further, it should be noted that in some examples, offset values may be inferred. For example, for particular combinations of a CTU size and a picture size, an offset value may be inferred for partitioning fractional boundary CTUs. For example, in the case of a CTU size of 128×128 and a picture size of 1920×1080, in one example, if a one-quarter asymmetric horizontal BT split mode (or a symmetric horizontal BT split mode or a three-quarter asymmetric horizontal BT split mode) is signaled at the root of a fractional boundary CTU (according to syntax and semantics used for partitioning non-fraction CTUs), the signaled split may be inferred as corresponding to an asymmetric horizontal BT split mode having an offset of 56. It should be noted that in some examples, further partitioning may be enabled for the block resulting from the arbitrary offset partitioning.

As described above, a fractional boundary video block may be partitioned using a subset of available partition modes. In one example, video encoder may be configured to signal a partition for a fraction boundary video block a according to a subset of available partitioning modes. In one example, the option of not splitting a fraction boundary video block may be disallowed. In such an example, the binarization used to signal a non-fractional boundary video block may be modified for signaling the partitioning of a fraction boundary video block. For example, in a case where a non-fractional boundary video block may be partitioned using a combination of the QT partitioning, symmetric BT partitioning, ABT partitioning, and TT partitioning according to the example of bin coding signaling illustrate in Table 1. In one example, in the case where the option of not splitting a fraction boundary video block is disallowed, the example bin coding signaling illustrated in Table 2 may be used to signal a partitioning for a fraction boundary video block. In one example, in the case where the option of not splitting a fraction boundary video block is disallowed, the example bin coding signaling may include a Bin$_0$ indicating a QT split or a symmetric BT and Bin$_1$ indicating a BT split direction (e.g., 0=QT; 10=Horizontal BT; and 11=Vertical BT), until the fraction boundary video block is partitioned to a point where no further splitting is allowed.

TABLE 1

| | | Bin Coding | | | | |
|---|---|---|---|---|---|---|
| Bin$_0$ | Bin$_1$ | Bin$_2$ | Bin$_3$ | Bin$_4$ | Bin$_5$ | Partition Type |
| 1 | N/A | N/A | N/A | N/A | N/A | Quad |
| 0 | 0 | N/A | N/A | N/A | N/A | Leaf Node |

TABLE 1-continued

| | | Bin Coding | | | | |
|---|---|---|---|---|---|---|
| Bin$_0$ | Bin$_1$ | Bin$_2$ | Bin$_3$ | Bin$_4$ | Bin$_5$ | Partition Type |
| 0 | 1 | 0 | 0 | N/A | N/A | Horizontal Triple Tree at ¼ of block dimension. (Horizontal TT) |
| 0 | 1 | 1 | 0 | N/A | N/A | Vertical Triple Tree at ¼ of block dimension. (Vertical TT) |
| 0 | 1 | 0 | 1 | 0 | N/A | Horizontal BT |
| 0 | 1 | 0 | 1 | 1 | 0 | Horizontal ABT at ¼ from top (Hor_Up) |
| 0 | 1 | 0 | 1 | 1 | 1 | Horizontal ABT at ¼ from bottom (Hor_Down) |
| 0 | 1 | 1 | 1 | 0 | N/A | Vertical BT |
| 0 | 1 | 1 | 1 | 1 | 0 | Vertical ABT at ¼ from left (Ver_Left) |
| 0 | 1 | 1 | 1 | 1 | 1 | Vertical ABT at ¼ from right (Ver_Right) |

TABLE 2

| | | Bin Coding | | | |
|---|---|---|---|---|---|
| Bin$_0$ | Bin$_1$ | Bin$_2$ | Bin$_3$ | Bin$_4$ | Partition Type |
| 0 | N/A | N/A | N/A | N/A | Quad |
| 1 | 0 | 1 | N/A | N/A | Horizontal Triple Tree at ¼ of block dimension. (Horizontal TT) |
| 1 | 1 | 1 | N/A | N/A | Vertical Triple Tree at ¼ of block dimension. (Vertical TT) |
| 1 | 0 | 0 | 0 | N/A | Horizontal BT |
| 1 | 0 | 0 | 1 | 1 | Horizontal ABT at ¼ from top (Hor_Up) |
| 1 | 0 | 0 | 1 | 0 | Horizontal ABT at ¼ from bottom (Hor_Down) |
| 1 | 1 | 0 | 0 | N/A | Vertical BT |
| 1 | 1 | 0 | 1 | 1 | Vertical ABT at ¼ from left (Ver_Left) |
| 1 | 1 | 0 | 1 | 0 | Vertical ABT at ¼ from right (Ver_Right) |

In one example, if the portion of a fractional boundary video block extended within the picture boundary matches (e.g., same width, height) a supported size of a coding structure (e.g., a transform unit, prediction unit, or coding unit) then the supported size is used for coding the block extent inside the picture boundary. That is, the fractional boundary video block is partitioned to the corresponding support size. In one example, such a determination may be made by a video decoder when a corresponding partitioning signal is received for the fractional boundary video block (e.g., if NO_SPLIT is received, partition to supported size). In one example, a video decoder may partition the fractional boundary video to a supported size using an inference rule (i.e., without receiving explicit signaling).

As described above, an inferred partitioning of a fractional video block may include performing a number of recursive QT splits. In one example, the number of recursive QT splits to perform may be indication according SPS, PPS, and/or slice header signaling. In one example the signaling may be based on the following semantics:

```
Sequence parameter set {
...
  sps_min_QT_split_for_CTU_at_right_picture_edge
  sps_min_QT_split_for_CTU_at_bottom_picture_edge
```

```
    sps_min_QT_split_for_CTU_at_rightbottom_picture_corner
    sps_slice_level_override_present
...
}
Slice header {
...
    if (sps_slice_level_override_present)
    {
        slice_min_QT_split_for_CTU_at_right_picture_edge
        slice_min_QT_split_for_CTU_at_bottom_picture_edge
        slice_min_QT_split_for_CTU_at_rightbottom_picture_corner
    }
...
}
```

Where each of the example syntax elements X_min_QT_split_for_CTU_at_Y indicate the minimum number of QT splits to be performed for a corresponding CTU, and sps_slice_level_override_present indicates the presence of a slice level value that overrides the SPS level values.

It should be noted that in one example, a slice header may also additionally include a presence flag. In this manner, only selected slices (i.e., according to the value of the slice header presence flag) override the SPS level signaling. In particular, in one example, signaling may be based on the following semantics:

```
Sequence parameter set {
...
    sps_min_QT_split_for_CTU_at_right_picture_edge
    sps_min_QT_split_for_CTU_at_bottom_picture_edge
    sps_min_QT_split_for_CTU_at_rightbottom_picture_corner
    sps_slice_level_override_present
...
}
Slice header {
...
    if (sps_slice_level_override_present)
    {
    slice_level_override_flag
    if(slice_level_override_flag)
        {
        slice_min_QT_split_for_CTU_at_right_picture_edge
        slice_min_QT_split_for_CTU_at_bottom_picture_edge
        slice_min_QT_split_for_CTU_at_rightbottom_picture_corner
        }
    }
...
}
```

Where slice_level_override_flag indicates the presence of subsequent syntax elements as illustrated.

In one example, the signaling may be based on the following semantics, which may be included, for example, in one of a parameter set or a slice header:

```
{
...
    same_min_QT_split_value_for_all_boundary_CTUs_flag
    if (same_min_QT_split_value_for_all_boundary_CTUs_flag)
    {
        min_QT_split_for_CTU_at_boundary
    }
    else
    {
        min_QT_split_for_CTU_at_right_picture_edge
        min_QT_split_for_CTU_at_bottom_picture_edge
        min_QT_split_for_CTU_at_rightbottom_picture_corner
    }
...
}
```

Where same_min_QT_split_value_for_all_boundary_CTUs_flag indicated the same number of splits as provided by min_QT_split_for_CTU_at_boundary is applied to all of the fraction boundary CTUs.

In one example, when same_min_QT_split_value_for_all_boundary_CTUs_flag is not present in a bitstream (e.g. implicit signaling) it is inferred to a default value (e.g., 1).

In one example, the signaling may be based on the following semantics:

```
Sequence parameter set {
...
min_QT_split_for_CTU_edge_signaled
if (min_QT_split_for_CTU_edge_signaled){
    same_min_QT_split_value_for_all_boundary_CTUs_flag
    if (same_min_QT_split_value_for_all_boundary_CTUs_flag)
    {
        min_QT_split_for_CTU_at_boundary
    }
    else
    {
        min_QT_split_for_CTU_at_right_picture_edge
        min_QT_split_for_CTU_at_bottom_picture_edge
        min_QT_split_for_CTU_at_rightbottom_picture_corner
    }
    sps_slice_level_override_present
}
```

```
Slice header {
...
    if (sps_slice_level_override_present)
    {
    slice_level_override_flag
    if(slice_level_override_flag)
        if (same_min_QT_split_value_for_all_boundary_CTUs_flag)
        {
            slice_min_QT_split_for_CTU_at_boundary
        }
        else
        {
            slice_min_QT_split_for_CTU_at_right_picture_edge
            slice_min_QT_split_for_CTU_at_bottom_picture_edge
            slice_min_QT_split_for_CTU_at_rightbottom_picture_corner
        }
    }
...
}
```

Where min_QT_spli_for_CTU_edge_signaled indicates the presence of subsequent syntax elements as illustrated.

It should be noted that in some cases, min_QT_split_for_CTU_edge_signaled may not be present in a bitstream (e.g. implicit signaling) and may be inferred to a default value 0 or 1).

In one example, the signaling may be based on the following semantics:

```
Sequence parameter set {
...
min_QT_split_for_CTU_edge_signaled
if (min_QT_split_for_CTU_edge_signaled) {
```

```
same_min_QT_split_value_for_all_boundary_CTUs_flag
  if (same_min_QT_split_value_for_all_boundary_CTUs_flag)
    {
    min_QT_split_for_CTU_at_boundary
    }
  else
    {
    min_QT_split_for_CTU_at_right_picture_edge
    min_QT_split_for_CTU_at_bottom_picture_edge
    min_QT_split_for_CTU_at_rightbottom_picture_corner
    }
  sps_slice_level_override_present
  }
Slice header {
...
  if (sps_slice_level_override_present)
    {
    slice_level_override_flag
    if(slice_level_override_flag)
      {
      slice_min_QT_split_for_CTU_at_right_picture_edge
      slice_min_QT_split_for_CTU_at_bottom_picture_edge
      slice_min_QT_split_for_CTU_at_rightbottom_picture_corner
      }
    }
...
}
```

In one example, the signaling may be based on the following semantics:

```
Sequence parameter set {
...
min_QT_split_for_CTU_edge_signaled
if (min_QT_split_for_CTU_edge_signaled){
    same_min_QT_split_value_for_all_boundary_CTUs_flag
    if (same_min_QT_split_value_for_all_boundary_CTUs_flag)
      {
      min_QT_split_for_CTU_at_boundary
      }
    else
      {
      min_QT_split_for_CTU_at_right_picture_edge
      min_QT_split_for_CTU_at_bottom_picture_edge
      min_QT_split_for_CTU_at_rightbottom_picture_corner
      }
    sps_slice_level_override_present
    }
Slice header {
...
  if (sps_slice_level_override_present)
    {
    slice_level_override_flag
    if(slice_level_override_flag)
      {
      slice_min_QT_split_for_CTU_at_boundary
      }
    }
...
}
```

In one example, the signaling may be based on the following semantics:

```
Sequence parameter set {
...
min_QT_split_for_CTU_edge_signaled
if (min_QT_split_for_CTU_edge_signaled){
    min_QT_split_for_CTU_at_boundary
    sps_slice_level_override_present
    }
Slice header {
...
    if (sps_slice_level_override_present)
```

```
    {
    slice_level_override_flag
    if(slice_level_override_flag)
      {
      min_QT_split_for_CTU_at_right_picture_edge
      min_QT_split_for_CTU_at_bottom_picture_edge
      min_QT_split_for_CTU_at_rightbottom_picture_corner
      }
    }
...
}
```

In one example, the signaling may be based on the following semantics:

```
Sequence parameter set {
...
min_QT_split_for_CTU_edge_signaled
if (min_QT_split_for_CTU_edge_signaled){
    min_QT_split_for_CTU_at_right_picture_edge
    min_QT_split_for_CTU_at_bottom_picture_edge
    min_QT_split_for_CTU_at_rightbottom_picture_corner
    sps_slice_level_override_present
    }
Slice header {
...
  if (sps_slice_level_override_present)
    {
    slice_level_override_flag
    if(slice_level_override_flag)
      {
      slice_min_QT_split_for_CTU_at_boundary
      }
    }
...
}
```

In one example, the signaling may be based on the following semantics, which may be included, for example, in one of a parameter set or a slice header:

```
{
...
min_QT_split_information_present_flag
if (min_QT_split_information_present_flag)
  {
  min_QT_split_for_CTU_at_right_picture_edge
  min_QT_split_for_CTU_at_bottom_picture_edge
  min_QT_split_for_CTU_at_rightbottom_picture_corner
  }
else
  {
  // infer values
  }
...
}
```

In one example, the signaling above may be included in a slice header based on a flag which is included in a parameter set and/or an inferred value.

In one example, the signaling may be based on the following semantics:

```
Sequence parameter set {
...
   sps_min_QT_split_in_I_SLICE_for_CTU_at_right_picture_edge
   sps_min_QT_split_in_I_SLICE_for_CTU_at_bottom_picture_edge
   sps_min_QT_split_in_I_SLICE_for_CTU_at_rightbottom_picture_corner
   sps_min_QT_split_in_P_SLICE_for_CTU_at_right_picture_edge
   sps_min_QT_split_in_P_SLICE_for_CTU_at_bottom_picture_edge
   sps_min_QT_split_in_P_SLICE_for_CTU_at_rightbottom_picture_corner
   sps_min_QT_split_in_B_SLICE_for_CTU_at_right_picture_edge
   sps_min_QT_split_in_B_SLICE_for_CTU_at_bottom_picture_edge
   sps_min_QT_split_in_B_SLICE_for_CTU_at_rightbottom_picture_corner
...
}
```

Where Each of the Example Syntax Elements X_min_QT_split_in_Y_SLICE_for_CTU_at_Z indicates the minimum number of QT splits to be performed for a corresponding CTU according to a location and a slice type.

In one example, the signaling may be based on the following semantics:

```
Sequence parameter set {
...
  sps_min_QT_split_in_I_SLICE_luma_channel_for_CTU_at_right_picture_edge
  sps_min_QT_split_in_I_SLICE_luma_channel_for_CTU_at_bottom_picture_edge
  sps_min_QT_split_in_I_SLICE_luma_channel_for_CTU_at_rightbottom_picture_corner
  sps_min_QT_split_in_I_SLICE_chroma_channel_for_CTU_at_right_picture_edge
  sps_min_QT_split_in_I_SLICE_chroma_channel_for_CTU_at_bottom_picture_edge
  sps_min_QT_split_in_I_SLICE_chroma_channel_for_CTU_at_rightbottom_picture_corn
er
  sps_min_QT_split_in_P_SLICE_for_CTU_at_right_picture_edge
  sps_min_QT_split_in_P_SLICE_for_CTU_at_bottom_picture_edge
  sps_min_QT_split_in_P_SLICE_for_CTU_at_rightbottom_picture_corner
  sps_min_QT_split_in_B_SLICE_for_CTU_at_right_picture_edge
  sps_min_QT_split_in_B_SLICE_for_CTU_at_bottom_picture_edge
  sps_mtn_QT_split_in_B_SLICE_for_CTU_at_rightbottom_picture_corner
...
}
```

Where Each of the Example Syntax Elements X_min_QT_split_in_Y_SLICE_Z_channel_for_CTU_at_N indicates the minimum number of QT splits to be performed for a corresponding CTU according to a location, a slice type, a color component channel.

In one example, the signaling may be based on the following semantics:

```
Sequence parameter set {
...
  for (temporalID=0; temporalID<NumberOfTemporalLayers: temporalID++)
  {
  sps_min_QT_split_for_CTU_at_right_picture_edge[temporalID]
  sps_min_QT_split_for_CTU_at_bottom_picture_edge[temporalID]
  sps_min_QT_split_for_CTU_at_rightbottom_picture_corner[temporalID]
  }
...
}
```

Where Each of the Example Syntax Elements X_min_QT_split_for_CTU_at_Y[temporalID] indicates the minimum number of QT splits to be performed for a corresponding CTU according to a location and temporal layer value.

In this manner, video encoder 200 represents an example of a device configured to receive a video block including sample values, determine whether the video block is a fractional boundary video block and partition the sample values according to an inferred partitioning using a subset of available partition modes.

Referring again to FIG. 13, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 13, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 13, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 13, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode. Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 13). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 13, inter prediction processing unit 214 may receive reconstructed video block via filter unit 216. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data.

Referring again to FIG. 13, entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

Figure 19:
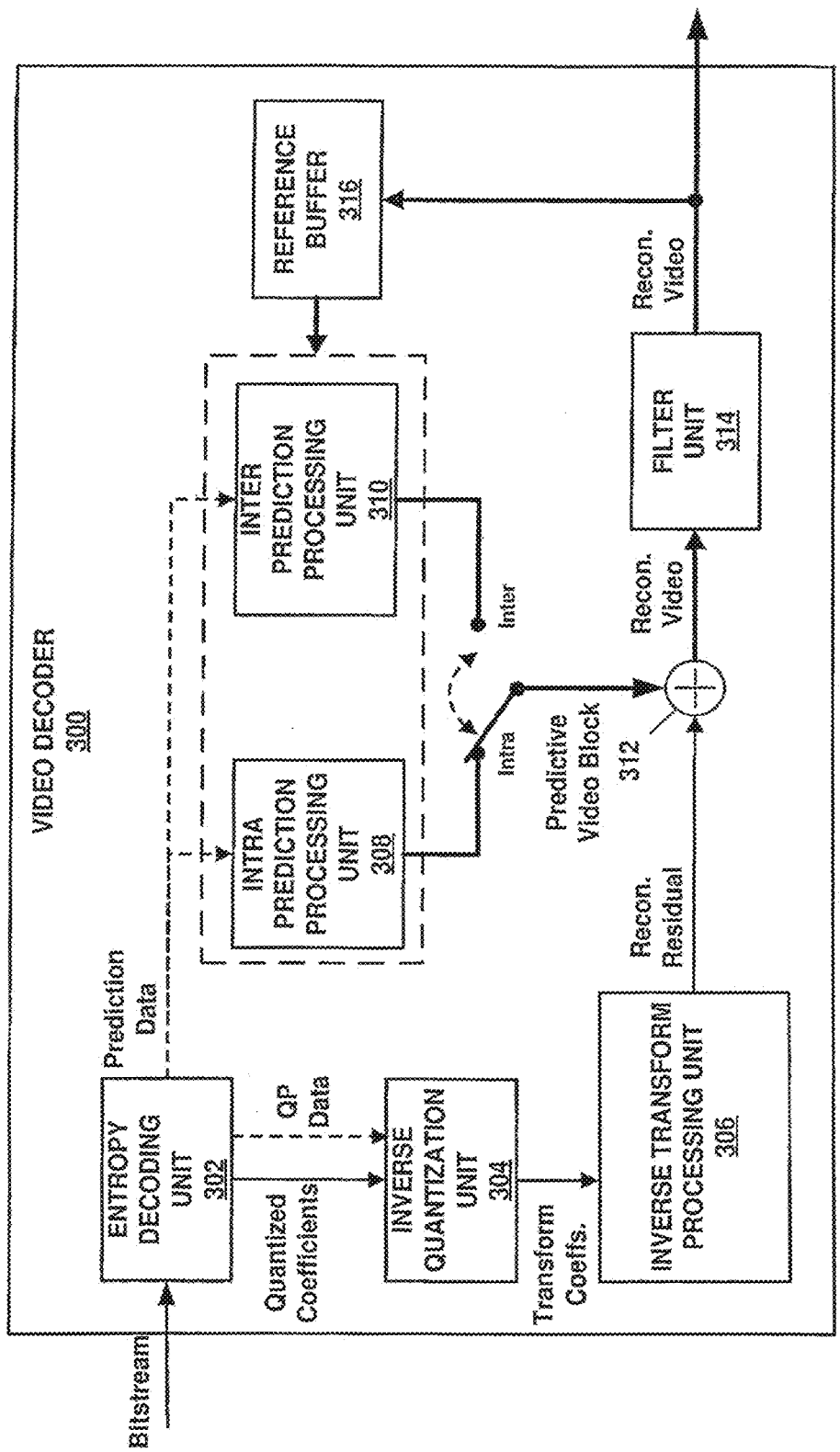
FIG. 19 is a block diagram illustrating an example of a video decoder that may be configured to decode video data according to one or more techniques of this disclosure.

FIG. 19 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 19 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 19, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. That is, for example, video decoder 300 may be configured to determine an inferred partitioning for fractional boundary video blocks based on one or more of the techniques described above for purposes of reconstructing video data. For example, video decoder 300 may be configured to parse syntax elements and/or evaluate properties of video data in order to determine a partitioning for fractional boundary video blocks.

Referring again to FIG. 19, inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. For example, inverse quantization unit 304 may be configured to infer predetermined values (e.g., determine a sum of QT depth and BT depth based on coding parameters), allowed quantization group sizes, and the like, according to the techniques described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 19, reconstructed residual data may be provided to summer 312. Summer 312 may add reconstructed residual data to a predictive video block and generate reconstructed video data. A predictive video block may be determined according to a predictive video technique (i.e., intra prediction and inter frame prediction). In one example, video decoder 300 and the filter unit 314 may be configured to determine QP values and use them for post filtering (e.g., deblocking). In one example, other functional blocks of the video decoder 300 which make use of QP may determine QP based on received signaling and use that for decoding.

Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 19, a reconstructed video block may be output by video decoder 300. In this manner, video decoder 300 may be configured to generate reconstructed video data according to one or more of the techniques described herein. In this manner video decoder 300 represents an example of a device configured to receive residual data corresponding to a coded video block including sample values, determine whether the coded video block is a fractional boundary video block, determine a partitioning for the coded video block according to an inferred partitioning using a subset of available partition modes, and reconstruct video data based on the residual data and the partitioning for the coded video block.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

CROSS REFERENCE

This Nonprovisional application claims priority under 35 U.S.C. § 119 on Application No. 62/693,325 on Jul. 2, 2018, the entire contents of which are hereby incorporated by reference.

The invention claimed is:

1. A decoder for decoding video data, the decoder comprising one or more processors configured to:
   determine whether a coding unit height or a coding unit width of a coding unit is greater than a constant value, wherein in a case that the coding unit height or the coding unit width exceeds the constant value, the coding unit is not allowed to be split by using a binary split;
   determine at least one of (i) whether a horizontal position of the coding unit extends beyond a right picture boundary and (ii) whether a vertical position of the coding unit extends beyond a bottom picture boundary;
   infer a value of a first flag, specifying whether the coding unit is split, to be equal to a first value indicating that the coding unit is split, in a case that at least one of (i) the horizontal position extends beyond the right picture boundary and (ii) the vertical position extends beyond the bottom picture boundary; and
   infer a value of a second flag to be equal to a second value indicating that a quadtree split is performed on the coding unit, in a case that (i) the horizontal position extends beyond the right picture boundary, (ii) the vertical position does not extend beyond the bottom picture boundary, and (iii) the coding unit height is greater than the constant value.

2. An encoder for encoding data, the encoder comprising one or more processors configured to:
   determine whether a coding unit height or a coding unit width of a coding unit is greater than a constant value, wherein in a case that the coding unit height or the coding unit width exceeds the constant value, the coding unit is not allowed to be split by to using a binary split;
   determine at least one of (i) whether a horizontal position of the coding unit extends beyond a right picture boundary and (ii) whether a vertical position of the coding unit extends beyond a bottom picture boundary;
   infer a value of a first flag, specifying whether the coding unit is split, to be equal to a first value indicting that the coding unit is split, in a case that at least one of (i) the horizontal position extends beyond the right picture boundary and (ii) the vertical position extends beyond the bottom picture boundary; and
   infer a value of a second flag to be equal to a second value indicating that a quadtree split is performed on the coding unit, in a case that (i) the horizontal position extends beyond the right picture boundary, (ii) the vertical position does not extend beyond the bottom picture boundary, and (iii) the coding unit height is greater than the constant value.

3. A decoding method for decoding video data, the method including:
- determining whether a coding unit height or a coding unit width of a coding unit is greater than a constant value, wherein in a case that the coding unit height or the coding unit width that exceeds the constant value, the coding unit is not allowed to be split by using a binary split;
- determining at least one of (i) whether a horizontal position of the coding unit extends beyond a right picture boundary and (ii) a vertical position of the coding unit extends beyond a bottom picture boundary;
- inferring a value of a first flag, specifying whether the coding unit is split, to be equal to a first value indicating that the coding unit is split, in a case that at least one of (i) the horizontal position extends beyond the right picture boundary and (ii) the vertical position extends beyond the bottom picture boundary; and
- inferring a value of a second flag to be equal to a second value indicating that the-a quadtree split is performed on the coding unit, in a case that (i) the horizontal position extends beyond the right picture boundary, (ii) the vertical position does not extend beyond the bottom picture boundary, and (iii) the coding unit height is greater than the constant value.

4. The decoder of claim 1, wherein the one or more processors are further configured to:
- infer the value of the second flag to be equal to the second value indicating that the quadtree split is performed on the coding unit, in a case that (i) the horizontal position does not extend beyond the right picture boundary, (ii) the vertical position extends beyond the bottom picture boundary, and (iii) the coding unit width is greater than the constant value.

* * * * *